US010395550B2

(12) United States Patent
Delisle

(10) Patent No.: US 10,395,550 B2
(45) Date of Patent: Aug. 27, 2019

(54) PORTABLE COMPUTING DEVICE AND METHOD FOR TRANSMITTING INSTRUCTOR OPERATING STATION (IOS) FILTERED INFORMATION

(71) Applicant: CAE INC, Saint Laurent (CA)

(72) Inventor: Jean-Francois Delisle, Saint-Laurent (CA)

(73) Assignee: CAE INC, Saint-Laurent, QC (CA)

( * ) Notice: Subject to any disclaimer, the term of this patent is extended or adjusted under 35 U.S.C. 154(b) by 295 days.

(21) Appl. No.: 15/046,085

(22) Filed: Feb. 17, 2016

(65) Prior Publication Data

US 2017/0236440 A1    Aug. 17, 2017

(30) Foreign Application Priority Data

Feb. 17, 2016 (CA) ...................................... 2920914

(51) Int. Cl.
*G09B 9/08* (2006.01)
*G09B 9/00* (2006.01)
(Continued)

(52) U.S. Cl.
CPC ................. *G09B 9/08* (2013.01); *G06F 3/14* (2013.01); *G09B 5/125* (2013.01); *G09B 5/14* (2013.01);
(Continued)

(58) Field of Classification Search
CPC .............. G09B 9/00; G09B 9/052; G06F 3/14
(Continued)

(56) References Cited

U.S. PATENT DOCUMENTS 4,425,097 A * 1/1984 Owens ...................... G09B 9/04
434/219
6,077,077 A * 6/2000 Geipe ....................... G09B 9/08
340/945

(Continued)

FOREIGN PATENT DOCUMENTS

WO    WO 2010044982         4/2010
WO        2015143530 A1    10/2015
WO        2015158432 A1    10/2015

OTHER PUBLICATIONS

European Search Report dated Jun. 6, 2019 for corresponding EP application No. 17752593.8.

*Primary Examiner* — Michael A Cuff
(74) *Attorney, Agent, or Firm* — Gowling WLG (Canada) LLP; Benoit Yelle

(57) ABSTRACT

A portable computing device and method for transmitting Instructor Operating Station (IOS) filtered information. A portable computing device receives IOS control and monitoring data from a simulation server, displays the IOS control and monitoring data on the portable computing device, and receives a selection by a user of at least one component of the displayed IOS control and monitoring data. The selection is performed by an interaction of the user with the displayed IOS control and monitoring data. The portable computing device determines IOS filtered information related to the selected at least one component, and transmits the IOS filtered information to a destination computing device. The determination of the IOS filtered information takes into consideration destination user access rights of a destination user. The destination device may be a simulator or a portable computing device, where the destination user performs a simulation session by interacting with the simulation server.

18 Claims, 20 Drawing Sheets

(51) Int. Cl.
  *G09B 5/12* (2006.01)
  *G09B 5/14* (2006.01)
  *G06F 3/14* (2006.01)
  *G09B 9/02* (2006.01)
  *G09B 9/24* (2006.01)
  *G09B 9/30* (2006.01)
  *G09B 9/40* (2006.01)
  *G09B 19/16* (2006.01)
  *G06F 3/0484* (2013.01)

(52) U.S. Cl.
  CPC ............. *G09B 9/00* (2013.01); *G09B 9/02* (2013.01); *G09B 9/24* (2013.01); *G09B 9/30* (2013.01); *G09B 9/40* (2013.01); *G09B 19/165* (2013.01); *G06F 3/04842* (2013.01)

(58) Field of Classification Search
  USPC .......................................... 434/29, 362, 365
  See application file for complete search history.

(56) References Cited

U.S. PATENT DOCUMENTS

| | | | |
|---|---|---|---|
| 6,106,297 A | 8/2000 | Pollak et al. | |
| 7,117,135 B2 | 10/2006 | Cull et al. | |
| 7,346,437 B2 | 3/2008 | Petillon | |
| 8,665,121 B2 | 3/2014 | Shavit | |
| 8,770,977 B2 | 7/2014 | Slayton et al. | |
| 8,856,262 B1 | 10/2014 | Eilam | |
| 9,652,590 B2* | 5/2017 | Yeager | G06F 19/3406 |
| 2002/0072414 A1 | 6/2002 | Stylinski et al. | |
| 2003/0214533 A1 | 11/2003 | Cull et al. | |
| 2004/0004634 A1* | 1/2004 | Li | G09B 5/06 715/733 |
| 2004/0148350 A1 | 7/2004 | Lacy | G09B 7/02 709/205 |
| 2005/0214728 A1* | 9/2005 | Kikuchi | H04L 12/1822 434/307 R |
| 2007/0190513 A1* | 8/2007 | Ito | G09B 5/14 434/350 |
| 2007/0236366 A1* | 10/2007 | Gur | G06K 9/00 340/945 |
| 2008/0207401 A1* | 8/2008 | Harding | A63B 24/0006 482/4 |
| 2008/0214253 A1 | 9/2008 | Gillo | |
| 2009/0148824 A1* | 6/2009 | Argott | G09B 5/08 434/307 R |
| 2009/0220929 A1 | 9/2009 | Daniel | |
| 2009/0271169 A1* | 10/2009 | Minto | G09B 9/00 703/18 |
| 2009/0319238 A1 | 12/2009 | Bedard | |
| 2009/0325131 A1 | 12/2009 | Cernasov et al. | |
| 2010/0100520 A1 | 4/2010 | Dargue et al. | |
| 2010/0125625 A1* | 5/2010 | Oliver | H04M 3/38 709/203 |
| 2010/0266991 A1 | 10/2010 | Gregoire et al. | |
| 2011/0008758 A1* | 1/2011 | Kortas | G09B 7/02 434/219 |
| 2012/0208153 A1 | 8/2012 | Bolla et al. | |
| 2012/0216142 A1 | 8/2012 | Bock et al. | |
| 2013/0218823 A1 | 8/2013 | Ferrand | |
| 2013/0295538 A1* | 11/2013 | Ambrose | G09B 9/00 434/218 |
| 2013/0324245 A1 | 12/2013 | Harvey | |
| 2014/0013234 A1* | 1/2014 | Beveridge | G06F 3/0484 715/740 |
| 2014/0057231 A1* | 2/2014 | Lutz | G09B 5/00 434/219 |
| 2014/0109113 A1 | 4/2014 | Stacy et al. | |
| 2014/0143692 A1* | 5/2014 | Wigdor | G06F 3/0488 715/764 |
| 2014/0186810 A1 | 7/2014 | Falash et al. | |
| 2014/0315166 A1 | 10/2014 | Williams et al. | |
| 2014/0337429 A1 | 11/2014 | Asenjo et al. | |
| 2015/0022536 A1* | 1/2015 | Guy | G06F 3/14 345/522 |
| 2015/0039551 A1 | 2/2015 | Huet et al. | |
| 2015/0111180 A1 | 4/2015 | Wheller et al. | |
| 2015/0379221 A1* | 12/2015 | Yeager | G06F 19/3406 715/771 |
| 2016/0019808 A1 | 1/2016 | Chavez et al. | |
| 2017/0139564 A1* | 5/2017 | Belekar | G06F 3/0484 |

\* cited by examiner

PORTABLE COMPUTING DEVICE AND METHOD FOR TRANSMITTING INSTRUCTOR OPERATING STATION (IOS) FILTERED INFORMATION

TECHNICAL FIELD

The present disclosure relates to the field of simulators. More specifically, the present disclosure relates to a portable computing device and method for transmitting Instructor Operating Station (IOS) filtered information.

BACKGROUND

Flight simulators are used by commercial airlines and air forces to train their pilots to face various types of situations. A simulator is capable of simulating various functionalities of an aircraft, and of reproducing various operational conditions of a flight (e.g. takeoff, landing, hovering, etc.). A trainee (e.g. a pilot performing a training session) interacts with the simulator to control various functionalities of the simulated aircraft during a simulation executed by the simulator. Similarly, an instructor (e.g. an experienced pilot) may interact with the simulator for various purposes, including controlling a simulation currently executed by the simulator, creating or updating simulation scenarios, controlling the simulation environment of a trainee, etc.

The instructor may control the simulation currently executed by the simulator, and performed by the trainee(s), via a portable computing device displaying a dedicated Graphical User Interface (GUI) on a display of the portable computing device. The dedicated GUI displays specific information accessible to the instructor, but not to the trainee. However, in some particular circumstances, the instructor may want to share some of the information displayed in the dedicated GUI with the trainee.

Therefore, there is a need for a portable computing device and method for transmitting Instructor Operating Station (IOS) filtered information.

SUMMARY

According to a first aspect, the present disclosure provides a portable computing device capable of transmitting Instructor Operating Station (IOS) filtered information. The portable computing device comprising a display, a user interface for allowing interactions of a user with the portable computing device, and a communication interface for exchanging data with other entities. The portable computing device also comprises a processing unit for receiving IOS control and monitoring data from a simulation server via the communication interface. The processing unit further displays the IOS control and monitoring data on the display. The processing unit further receives a selection by the user of at least one component of the IOS control and monitoring data displayed on the display via the user interface. The processing unit further determines IOS filtered information related to the selected at least one component. The determination of the IOS filtered information takes into consideration destination user access rights of a destination user. The processing unit further transmits the IOS filtered information to a destination computing device via the communication interface.

According to a second aspect, the present disclosure provides a method for transmitting Instructor Operating Station (IOS) filtered information. The method comprises receiving by a processing unit of a portable computing device IOS control and monitoring data from a simulation server via a communication interface of the portable computing device. The method comprises displaying by the processing unit the IOS control and monitoring data on a display of the portable computing device. The method comprises receiving by the processing unit a selection by a user of at least one component of the IOS control and monitoring data displayed on the display. The selection is performed by an interaction of the user with the displayed IOS control and monitoring data via a user interface of the portable computing device. The method comprises determining by the processing unit IOS filtered information related to the selected at least one component. The determination of the IOS filtered information takes into consideration destination user access rights of a destination user. The method comprises transmitting by the processing unit the IOS filtered information to a destination computing device via the communication interface.

According to a third aspect, the present disclosure provides a non-transitory computer program product comprising instructions deliverable via an electronically-readable media, such as storage media and communication links. The instructions when executed by a processing unit of a portable computing device providing for transmitting Instructor Operating Station (IOS) filtered information by implementing the aforementioned method.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the transmission of a subset of data currently displayed on a display of a portable computing device, the displayed data allowing a user of the portable computing device to control the execution of a simulation executed on a simulation server. The subset of data is transmitted to a destination computing device where a destination user is performing a simulation session related to the simulation executed on the simulation server. The subset of data to be transmitted is determined based on particular user access rights of the destination user. Although the examples provided in the rest of the disclosure are in the field of aircraft simulators, the teachings of the present disclosure can also be applied to simulators of terrestrial vehicles such as tanks, maritime vehicles such as boats, etc. The simulators may also perform a real time simulation of an underground system, a mining facility, a nuclear plant, a human body, etc.

Simulation Server

Figure 1:
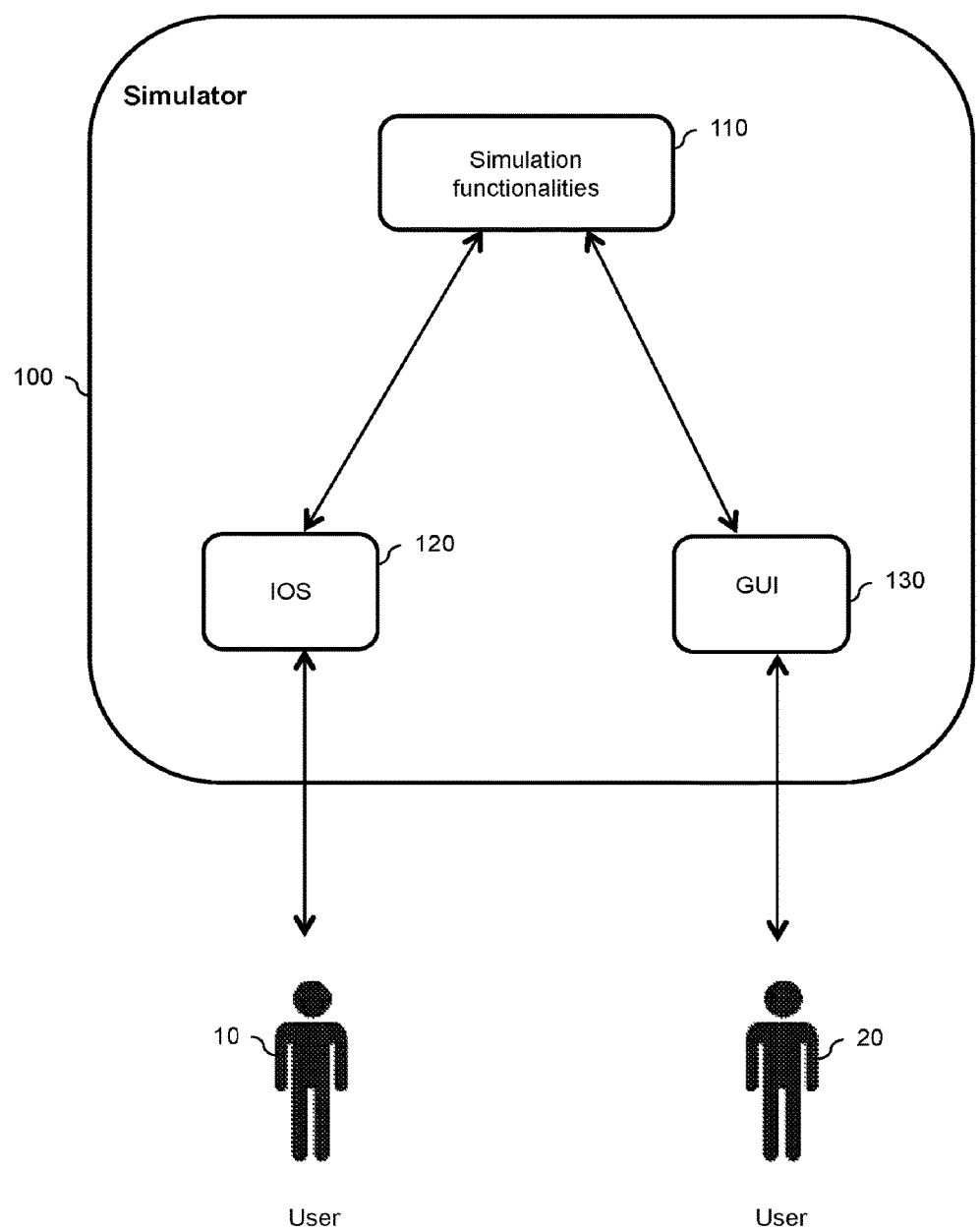
FIG. 1 illustrates a legacy simulator configuration.

Referring now to FIG. 1, a legacy simulator 100 is represented. The simulator 100 executes a simulation. The execution of the simulation is generally performed in real time and encompasses a plurality of functions, which are performed sequentially or concurrently.

The execution of the simulation comprises executing one or more simulation functionalities 110. In the case of an aircraft simulator, examples of simulation functionalities 110 include simulations of the following components of the aircraft: simulation of the engines, simulation of the landing gear, simulation of the electrical circuits, simulation of the hydraulic circuits, simulation of the cockpit, etc. Furthermore, the execution of particular simulation functionality 110 may trigger the display of generated simulation data (e.g. in the form of a navigation map, a radar map, a weather map, a flight map, aircraft data, etc.) on a display of the simulator 100. Simulation functionalities 110 can be implemented separately in software modules executed by the simulator 100, or grouped per category of equipment, type of simulation, etc. into larger software modules. The simulator 100 is capable of executing several simulation functionalities 110 in parallel, to perform an exhaustive simulation of the aircraft. Alternatively, the simulator 100 executes a single simulation functionality 110 (or a limited number of simulation functionalities 110) to perform a restricted simulation of the aircraft, focusing on specific systems and sub-systems of the aircraft (e.g. only the engines, only the engines and landing gear in combination, etc.).

The execution of the simulation also comprises executing a simulator Graphical User Interface (GUI) functionality 130. The simulator GUI functionality 130 allows a user 20 (for example a trainee) to interact with the simulator 100, and more specifically with the simulation functionalities 110 currently executed by the simulator 100. In the case of an aircraft simulator, the simulator GUI functionality 130 comprises displaying simulation data generated by the simulation functionalities 110 on one or more displays of the simulator 100. The displayed simulation data may include flight parameters (e.g. altitude, speed, etc.), aircraft parameters (e.g. remaining fuel, alarms, etc.), maps (e.g. navigation map, weather map, radar map, etc.), virtual controls, out-of window information, etc. The simulator GUI functionality 130 also comprises receiving interactions from the user 20 via one or more user interfaces of the simulator 100. The user interface(s) may include traditional computer user interfaces (e.g. a keyboard, a mouse, a trackpad, a touch screen, etc.), as well as dedicated simulation user interfaces (e.g. switches, simulation command controls, joysticks, etc.). The interactions received from the user 20 are processed by the simulation functionalities 110, and affect the simulation of one or more systems of the aircraft.

The execution of the simulation also comprises executing an Instructor Operating Station (IOS) functionality 120. The IOS functionality 120 allows a user 10 (for example an instructor) to interact with the simulator 100, and more specifically with the simulation functionalities 110 currently executed by the simulator 100. For instance, IOS User Interface (UI) pages are displayed on a display of the simulator 100, allowing the user 10 to control in real time the execution of a particular simulation scenario executed by the simulation functionalities 110. The IOS 120 comprises graphical control elements (e.g. menus and sub-menus, list boxes, etc.) for controlling the execution of the simulation (e.g. modifying simulation parameters) and graphical display elements (e.g. images, text fields, icons, embedded videos, etc.) for displaying simulation data generated by the simulation functionalities 110. In the case of an aircraft simulator, the user 10 interacts with the IOS 120 via one or more user interfaces (e.g. a keyboard, a mouse, a trackpad, a touch screen, etc.) to configure and/or update simulation parameters (e.g. weather conditions, flight plan, etc.). The configured/updated simulation parameters are processed by the simulation functionalities 110, and affect the simulation of one or more systems of the aircraft.

In a particular embodiment, the execution of the simulation also comprises executing at least one proxy function (not represented in FIG. 1). The proxy function allows other functionalities of the simulator 100 (e.g. IOS functionality 120 and simulator GUI functionality 130) to interact with the simulation functionalities 110. A plurality of proxy functions may be executed concurrently, each proxy function providing an interface to a specific functionality among the simulation functionalities 110.

Figure 2A:
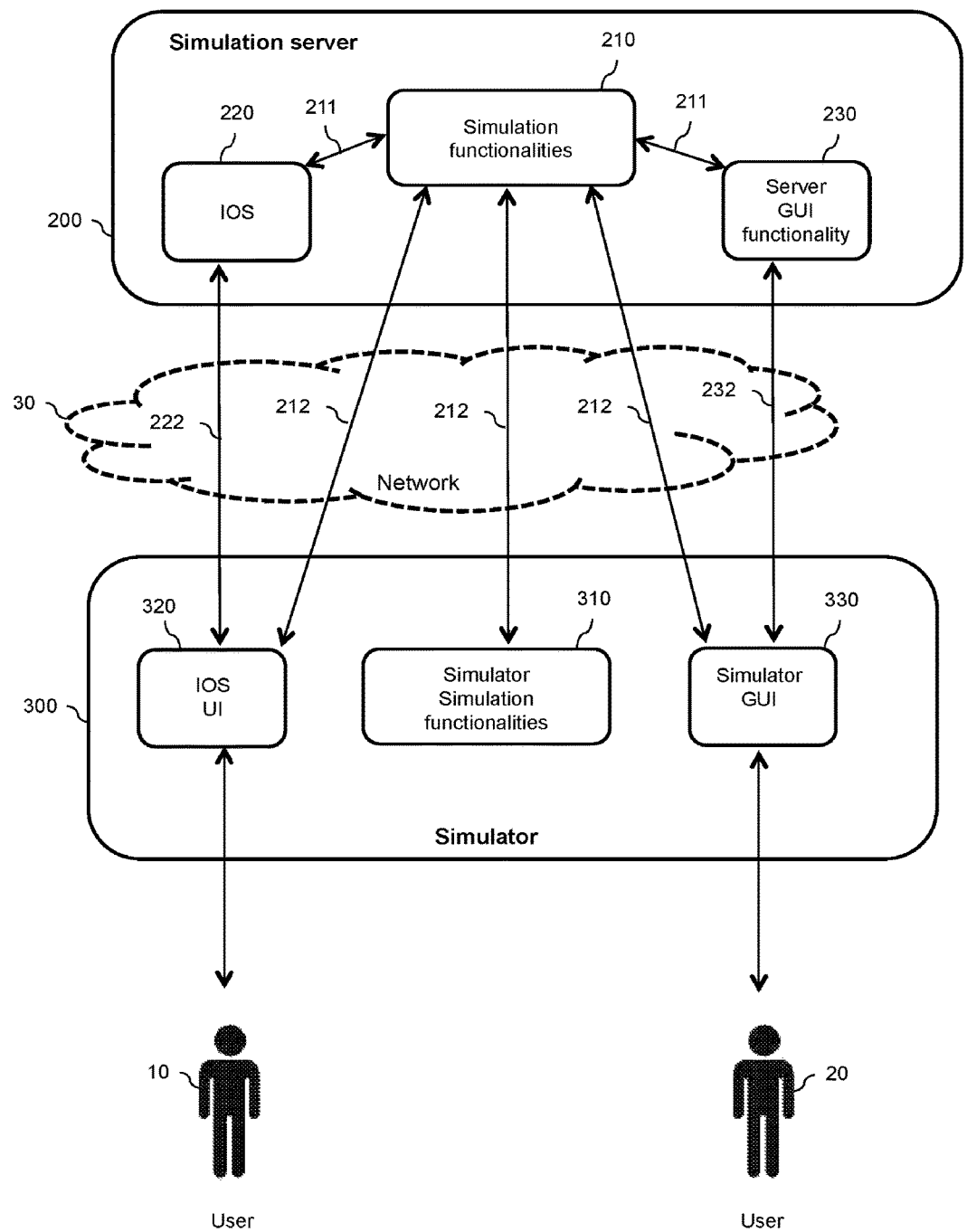
FIGS. 2A, 2B and 2C illustrate a simulation server interacting with a simulator and portable computing devices for executing a simulation.
Figure 2B:
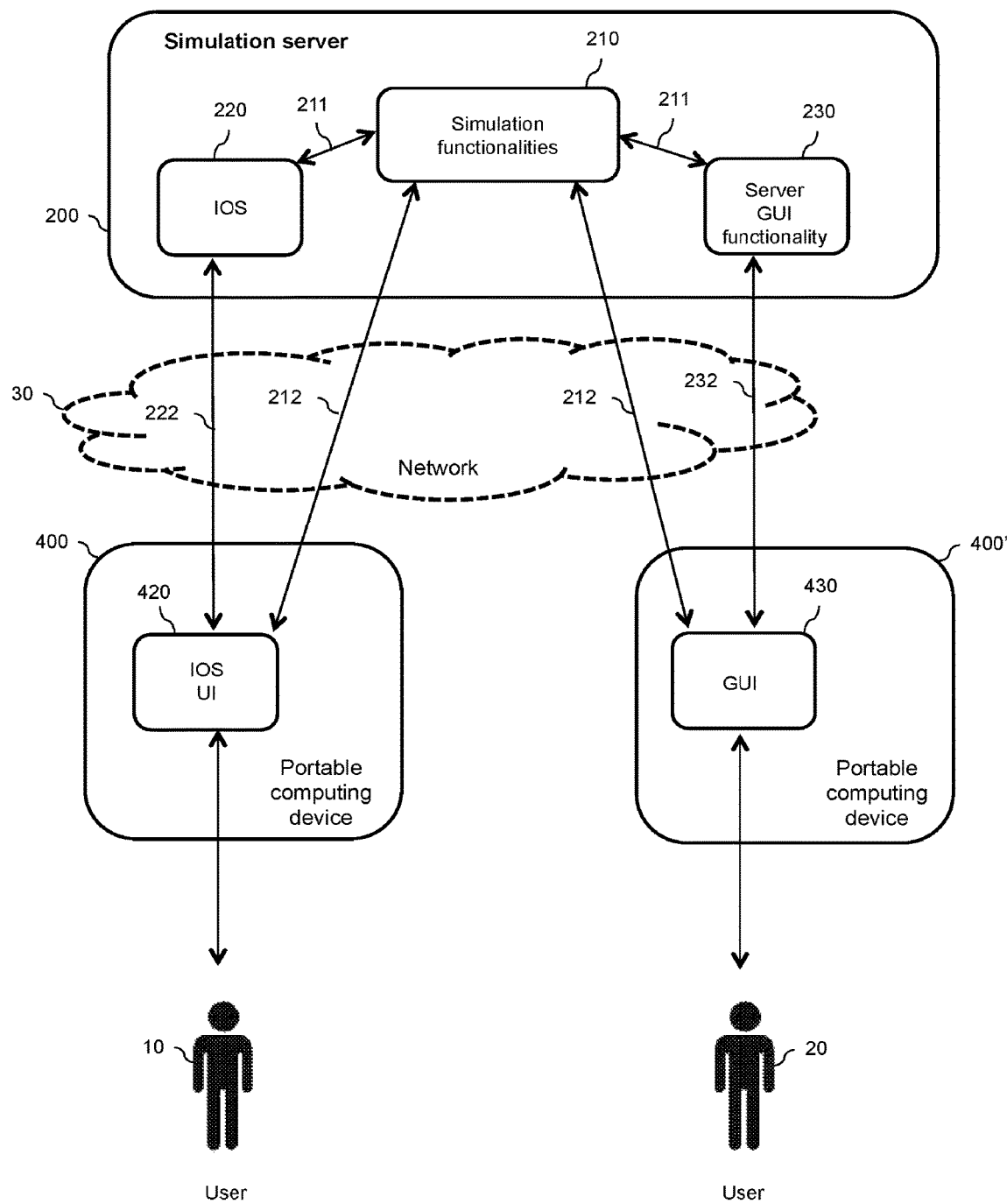
Figure 2C:
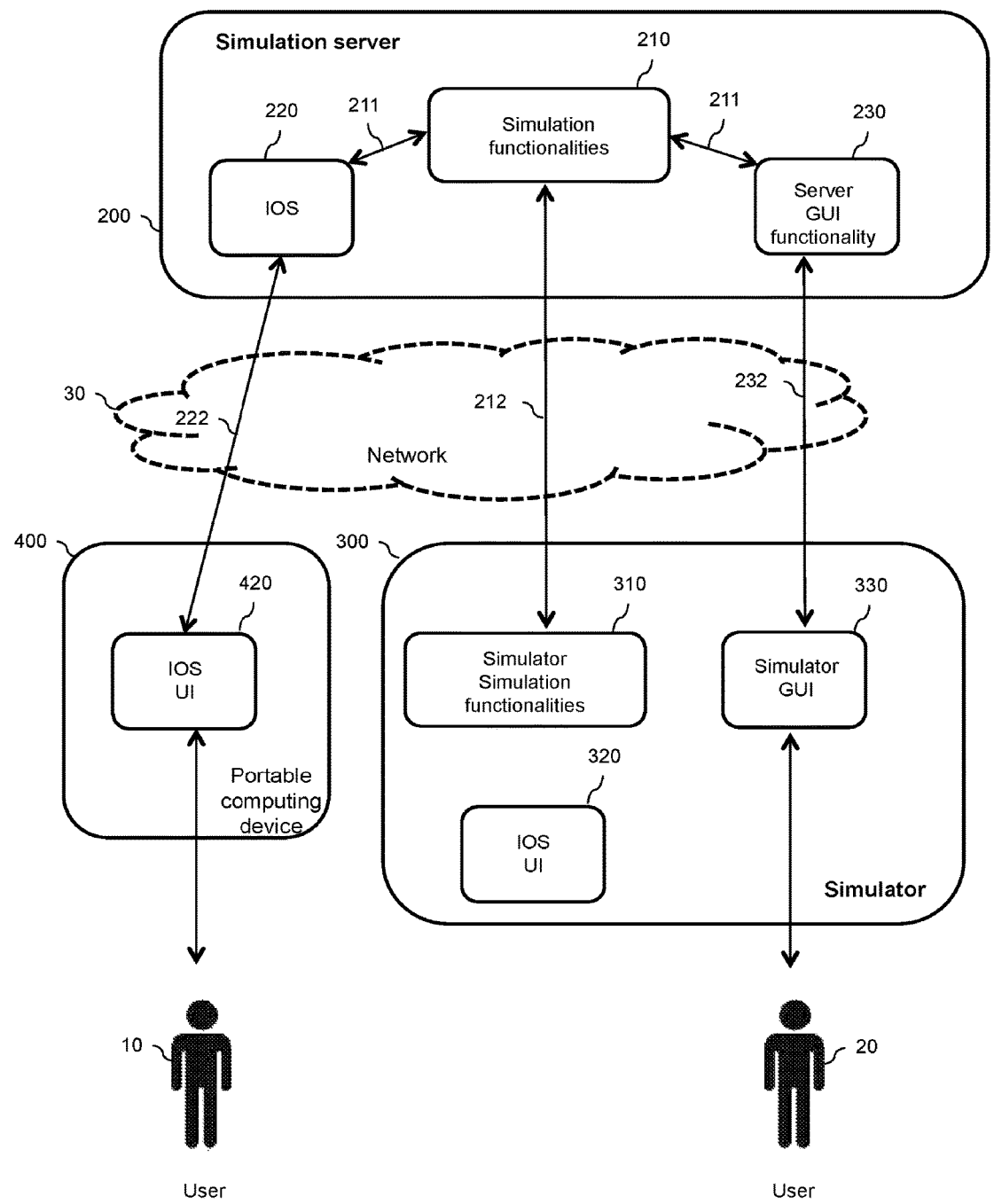

Referring now concurrently to FIGS. 2A, 2B and 2C, embodiments of a simulation server 200 and a simulator 300 in accordance with the present invention are represented. The present simulation server 200 and simulator 300 rely on sharing processing performed when executing a simulation between themselves.

The simulation server 200 executes a simulation, which comprises executing one or more server simulation functionalities 210, executing a server IOS functionality 220, and executing a server graphical user interface (GUI) functionality 230. The simulator 300 also executes the simulation, which comprises executing one or more simulator simulation functionalities 310, executing a simulator IOS User Interface (UI) 320, and executing a simulator graphical user interface (GUI) 330.

The simulation functionalities 110 of the legacy simulator 100 have been split between the server simulation functionalities 210 and the simulator simulation functionalities 310. The server simulation functionalities 210 perform the computations for simulating the operations of the simulated entity. The present simulation server 200 and simulator 300 may be used to simulate any type of entity, such as for example aircrafts, spatial shuttles, vessels, vehicles, etc. For simplicity purposes, the following description will provide examples related to aircrafts. Such examples are provided for example purposes only, and should not be construed to limit the scope of protection sought for the present simulation server 200 and simulator 300.

The server simulation functionalities 210 may perform computations for simulating components of the vehicle being simulated, for example engines, electrical circuits, hydraulic circuits, information shown and displayed to a user of the simulator, etc. The server simulation functionalities 210 generate simulation data 211, which are used locally by other functionalities implemented by the simulation server 200 (e.g. the server IOS functionality 220 and the server GUI functionality 230). The server simulation functionalities 210 also generate simulation data 212, which are transmitted to the simulator 300 through a communication network 30. The transmitted simulation data 212 can be used by the simulator GUI 330, the simulator IOS UI 320 and the simulator simulation functionalities 310, but may also be used by other functionalities implemented by the simulator 300 (this use case is not represented in FIG. 2A). The simulation data 212 include visual data in the form of static 2D or 3D simulation images, or a flow of 2D or 3D simulation images. Examples of visual data include a navigation map, a radar map, a weather map, a flight map, aircraft data, etc. For instance, a map may consist in a static 2D or 3D image, or a flow of 2D or 3D images corresponding to a real time streaming of the map. The visual data are displayed by at least one simulator GUI 330 and simulator IOS UI 320 on display(s) of the simulator 300. The simulation data 212 may also include actuation data, which are processed by the simulator simulation functionalities 310 for actuating physical component(s) of the simulator 300 (e.g. actuating hydraulic cylinders for moving a simulated control cabin representative of the entity). The simulator simulation functionalities 310 may also perform local computations for simulating some of the operations of the simulated entity, which are not performed by the server simulation functionalities 210. The simulator simulation functionalities 310 also generate feedback simulation data 212, which are transmitted to the simulation server 200 through the communication network 30. These feedback simulation data 212 are representative of an operational status of the simulator 300, and are used by the server simulation functionalities 210 as a feedback for taking into consideration the operational status of the simulator 300 when executing the simulation. For example, the server simulation functionalities 210 transmit simulation data 212 for actuating (by the simulator simulation functionalities 310) a physical component of the simulator 300, and the simulator simulation functionalities 310 transmit feedback simulation data 212 indicating that the activation of the physical component of the simulator 300 has been completed. Upon reception of the feedback simulation data 212, the server simulation functionalities 210 proceed with the next step in the execution of the simulation, taking into consideration the new operational status of the simulator 300.

The IOS functionality 120 of the legacy simulator 100 has also been split between the server IOS functionality 220 and the simulator IOS UI 320. The server IOS functionality 220 performs the computations related to the IOS functionality, while the simulator IOS UI 320 performs the interactions with a user 10. The server IOS functionality 220 generates IOS control and monitoring data 222, which are transmitted to the simulator 300 through the communication network 30. The IOS control and monitoring data 222 are used by the simulator IOS UI 320 for interacting with the user 10. The IOS control and monitoring data 222 includes IOS UI page(s), e.g. each IOS UI page corresponding to a user interface with sub-groups of instances, which are displayed on a display of the simulator 300 by the simulator IOS UI 320. The displayed IOS UI page(s) allow the user 10 to control in real time (at the simulator 300) the execution of a particular simulation scenario executed by the server simulation functionalities 210. More specifically, by interacting with the IOS UI 320, the user 10 generates IOS interaction data 222 (e.g. configuration, monitoring and/or update of simulation parameters), which are transmitted via the network 30 to the server IOS functionality 220. The server IOS functionality 220 interacts with the server simulation functionalities 210 by exchanging data 211. As mentioned previously, the data 211 include simulation data generated by the server simulation functionalities 210, and used by the server IOS functionality 220 for generating IOS UI pages(s), which are transmitted to the simulator IOS UI 320. The data 211 also include the configuration/update of simulation parameters received from the simulator IOS UI 320, which may be pre-processed by the server IOS functionality 220 before transmission to the server simulation functionalities 210. The server simulation functionalities 210 use the configuration/update of simulation parameters to control the execution of the simulation. As mentioned previously, the simulator IOS UI 320 also receives simulation data 212 (e.g. 2D or 3D maps) from the server simulation functionalities 210, displayed on display(s) of the simulator 300.

The simulator GUI functionality 130 of the legacy simulator 100 has also been split between the server GUI functionality 230 and the simulator GUI 330. The server GUI functionality 230 performs the computations related to the graphical representations to be displayed to the user 20, while the simulator GUI 330 performs the interactions with the user 20. The server GUI functionality 230 generates graphical user interface (GUI) graphical data 232, which are transmitted to the simulator 300 through the communication network 30. The GUI graphical data 232 are used by the simulator GUI 330 for interacting with the user 20. The GUI graphical data 232 include simulation parameters, events and information (e.g. entity parameters, events, maps, etc.), which are displayed on display(s) of the simulator 300 by the simulator GUI 330. The displayed GUI graphical data 232 allow the user 20 to interact in real time (at the simulator 300) with the execution of a particular simulation scenario executed by the server simulation functionalities 210. More specifically, based on the displayed GUI graphical data 232, the user 20 interacts with one or more user interfaces of the simulator 300. The simulator GUI 330 generates GUI interaction data 232 corresponding to the user 20 interactions, which are transmitted via the network 30 to the server GUI functionality 230. The server GUI functionality 230 interacts with the server simulation functionalities 210 by exchanging data 211. As mentioned previously, the data 211 include simulation data generated by the server simulation functionalities 210, and used by the server GUI functionality 230 for generating the simulation parameters, events and information transmitted to the simulator GUI 330. The data 211 also include the user 20 interactions received from the simulator GUI 330, which may be pre-processed by the server GUI functionality 230 before transmission to the server simulation functionalities 210. The server simulation functionalities 210 use the user 20 interactions to control the execution of the simulation. As mentioned previously, the simulator GUI 330 also receives simulation data 212 (e.g. 2D or 3D maps) from the server simulation functionalities 210, which are further displayed on the simulator 300 through the simulator GUI 330.

In a particular embodiment, at least one of the functionalities implemented by the legacy simulator 100 of FIG. 1 may not be deported on the simulation server 200, but fully implemented on the simulator 300. For example, the simulation server 200 does not include the server GUI functionality 230 and the simulator 300 includes the simulator GUI functionality 130 of the legacy simulator 100 in place of the simulator GUI 330. In this particular embodiment, the simulator GUI 130 is implemented on the simulator 300 and interacts directly with the server simulation functionalities 210 via the network 30. This embodiment is not represented in the Figures.

The network 30 may consist of a mobile network (e.g. a Wi-Fi network or cellular network), a fixed network (e.g. an Ethernet network), a combination thereof, etc. The network 30 may allow communications between devices over an Intranet, an Extranet, the global Internet, etc. The simulation server 200 and the simulator 300 both include a communication interface compatible with the network 30, for exchanging data over the network 30. For example, the simulation server 200 and the simulator 300 comprise a communication interface supporting both Wi-Fi and Ethernet, to easily adapt to a particular network 30 deployed at the premises where they are respectively operating.

Although not represented in FIG. 2A for simplification purposes, the server simulation functionalities 210 generally comprise a plurality of functions, for example a Weather function and a Navigation function (represented and described later with respect to FIG. 3A). The Navigation function of the server simulation functionalities 210 interfaces with other functionalities of the simulation server 200 (e.g. with the server GUI functionality 230 and with a dedicated IOS function IOS_1 (represented in FIG. 3A) of the server IOS functionality 220). Similarly, the Weather function of the server simulation functionalities 210 interfaces with other functionalities of the simulation server 200 (e.g. with the server GUI functionality 230 and with a dedicated IOS function IOS_2 (represented in FIG. 3A) of the server IOS functionality 220). As mentioned previously with respect to the legacy simulator represented in FIG. 1, a plurality of proxy functions may be used to interface the functions (e.g. Navigation and Weather respectively) of the server simulation functionalities 210 with other functionalities of the simulation server 200 (e.g. the server IOS functionality 220 and the server GUI functionality 230).

In the rest of the description, the simulation data 212 generated and transmitted by the server simulation functionalities 210 to the simulator 300 may be referred to as simulator simulation data. The IOS control and monitoring data 222 generated and transmitted by the server IOS functionality 220 to the simulator 300 may be referred to as simulator IOS control and monitoring data. The GUI graphical data 232 generated and transmitted by the server GUI functionality 230 to the simulator 300 may be referred to as simulator graphical data.

The IOS interaction data 222 generated and transmitted by the simulator IOS UI 320 to the simulation server 200 and the GUI interaction data 232 generated and transmitted by the simulator GUI 330 to the simulation server 200 may be referred to as simulator interaction data.

Referring now concurrently to FIGS. 2A and 2B, portable computing devices 400 and 400' are represented in FIG. 2B. The portable computing devices 400 and 400' implement some of the functionalities implemented on the simulator 300 represented in FIG. 2A.

The portable computing device 400 and 400' may consist in various types of computing devices having a form factor allowing easy carrying. Examples of such portable computing devices 400 and 400' include laptops, tablets, etc. The portable computing devices 400 and 400' both include a communication interface compatible with the network 30, for exchanging data with the simulation server 200 over the network 30.

The portable computing device 400 implements a portable computing device IOS UI 420 similar to the simulator IOS UI 320. The portable computing device IOS UI 420 exchanges IOS data 222 (IOS control and monitoring data, and IOS interaction data) with the server IOS functionality 220 over the network 30, in a similar manner as the simulator IOS UI 320. The portable computing device IOS UI 420 allows the user 10 to control in real time, via the portable computing device 400, the execution of a particular simulation scenario executed by the server simulation functionalities 210. The portable computing device IOS UI 420 also receives simulation data 212 (e.g. 2D or 3D maps) from the server simulation functionalities 210, which are further displayed on the portable computing device 400 through the portable computing device IOS UI 420.

In this configuration, the IOS functionality 120 of the legacy simulator 100 represented in FIG. 1 has been split between the server IOS functionality 220 and the portable computer device IOS UI 420. The server IOS functionality 220 performs the computations related to the IOS functionality, while the portable computing device IOS UI 420 performs the interactions with the user 10.

The server IOS functionality 220 is adapted for simultaneously or alternatively supporting interactions with the simulator IOS UI 320 and the portable computing device IOS UI 420. For example, the same user 10 can use the simulator IOS UI 320 during a first simulation session, and the portable computing device IOS UI 420 during a second simulation session, both sessions being performed by executing server simulation functionalities 210. In another example, a first user 10 uses the simulator IOS UI 320 during a simulation session (for controlling a first simulation functionality), and a second user 10 simultaneously uses the portable computing device IOS UI 420 during the same simulation session (for controlling a second simulation functionality), the simulation session being performed by executing the server simulation functionalities 210.

The portable computing device 400' implements a portable computing device graphical user interface (GUI) 430 similar to the simulator GUI 330. The portable computing device GUI 430 exchanges GUI graphical data and GUI interaction data 232 with the server GUI functionality 230 over the network 30, in a similar manner as the simulator GUI 330. The portable computing device GUI 430 allows the user 20 to interact in real time, via the portable computing device 400', with the execution of a particular simulation scenario executed by the server simulation functionalities 210. As mentioned previously, the portable computing device GUI 430 also receives and displays simulation data 212 (e.g. 2D or 3D maps) from the server simulation functionalities 210.

In this configuration, the simulator GUI functionality 130 of the legacy simulator 100 represented in FIG. 1 has been split between the server GUI functionality 230 and the portable computing device GUI 430. The server GUI functionality 230 performs the computations related to the graphical representations to be displayed to the user 10, while the portable computing device GUI 430 performs the interactions with the user 20.

The server GUI functionality 230 is adapted for simultaneously or alternatively supporting interactions with the simulator GUI 330 and the portable computing device GUI 430. For example, user 20 can use the simulator GUI 330 during a first training session, and the portable computing device GUI 430 during a second training session, both simulation sessions being performed by executing server simulation functionalities 210. In another example, a first user 20 uses the simulator GUI 330 during a simulation session (for interacting with a first simulation functionality 210), and a second user 20 simultaneously uses the portable computing device GUI 430 during the same simulation session (for interacting with a second simulation functionality 210), the simulation sessions being performed by executing the first and second server simulation functionalities 210.

In the rest of the description, the simulation data 212 generated and transmitted by the server simulation functionalities 210 to a portable computing device 400 or 400' may be referred to as portable computing device simulation data.

The IOS control and monitoring data 222 generated and transmitted by the server IOS functionality 220 to a portable computing device 400 may be referred to as portable computing device IOS control and monitoring data. The GUI graphical data 232 generated and transmitted by the server GUI functionality 230 to a portable computing device 400' may be referred to as portable computing device graphical data. The IOS interaction data 222 generated and transmitted by the portable computing device IOS UI 420 to the simulation server 200 and the GUI interaction data 232 generated and transmitted by the portable computing device GUI 430 to the simulation server 200 may be referred to as portable computing device interaction data.

FIG. 2C illustrates another operational configuration of the simulation server 200 and simulator 300. In this particular configuration, the user 10 uses the portable computing device IOS UI 420 for controlling in real time (through the server IOS functionality 220) the execution of a particular simulation scenario executed by the server simulation functionalities 210. The user 20 uses the simulator GUI 330 for interacting in real time (through the server GUI functionality 230) with the execution of the same particular simulation scenario executed by the server simulation functionalities 210.

A person skilled in the art will readily understand that the usage of the simulation server 200 provides the required flexibility for implementing a plurality of other operational configurations involving the simulation server 200, the simulator 300 and portable computing device(s) (e.g. 400 and 400'), which have not been represented in the Figures for simplification purposes.

Figure 3A:
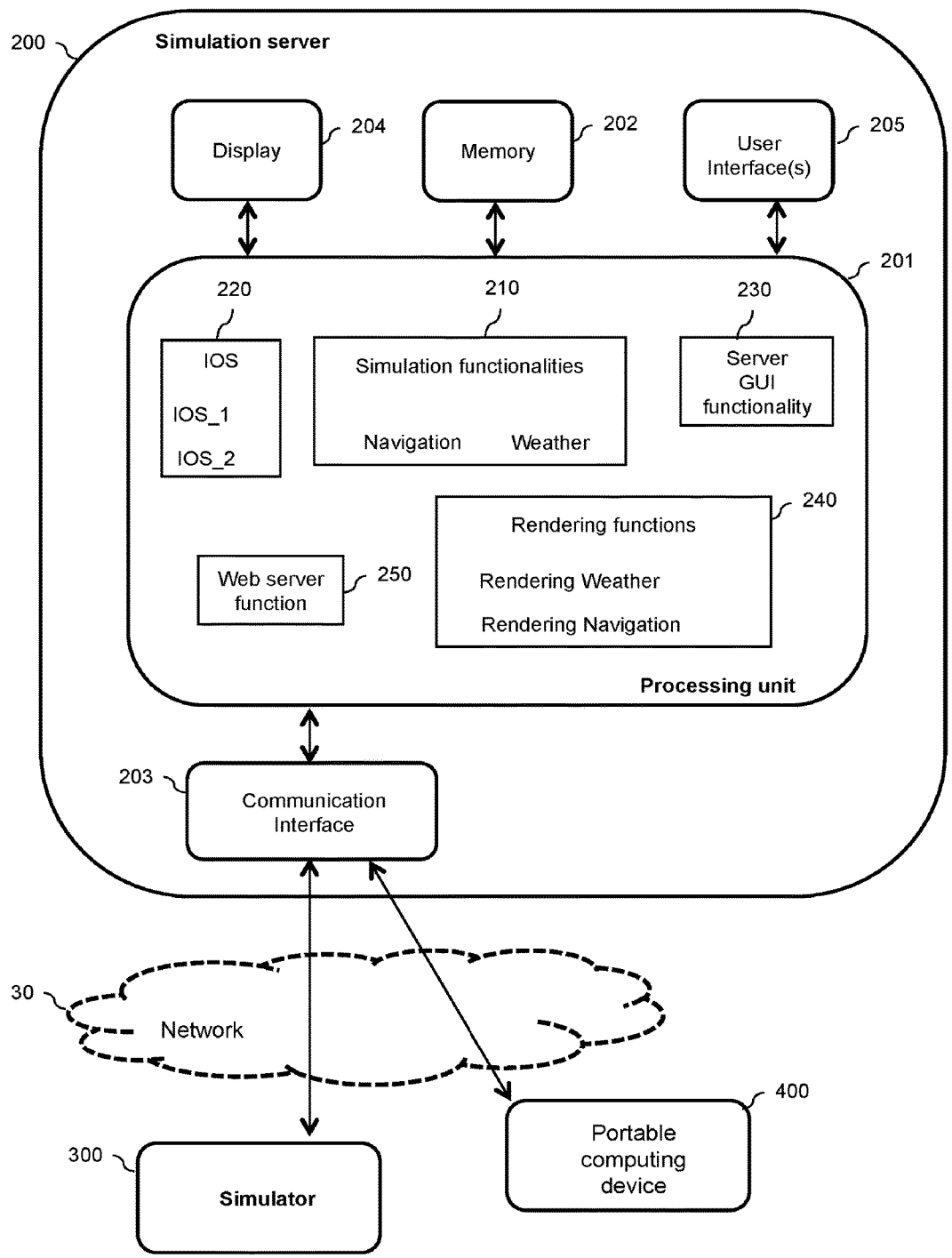
FIGS. 3A, 3B and 3C respectively illustrate exemplary embodiments of components and functionalities of the simulation server, simulator and portable computing devices of FIGS. 2A, 2B and 2C.
Figure 3B:
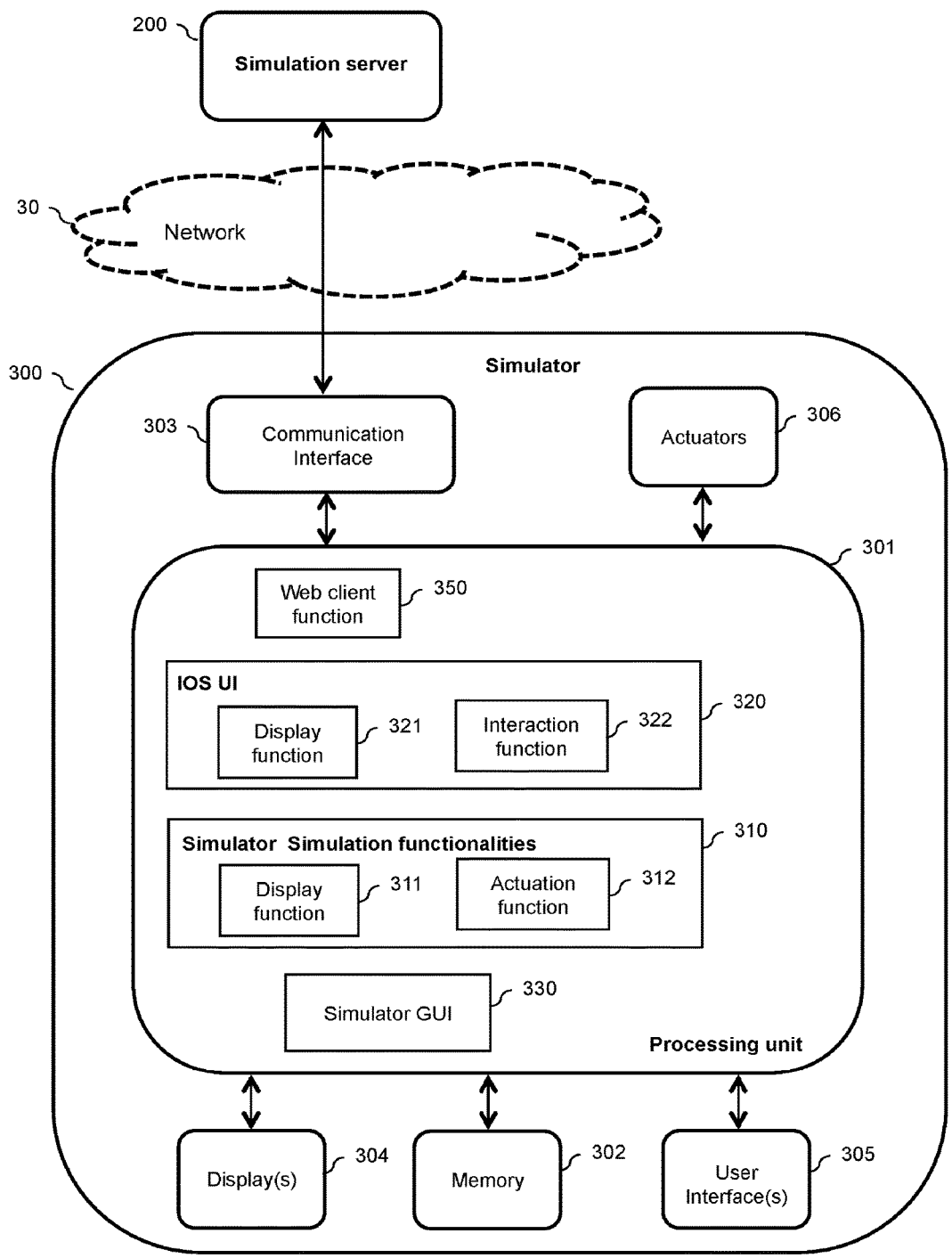
Figure 3C:
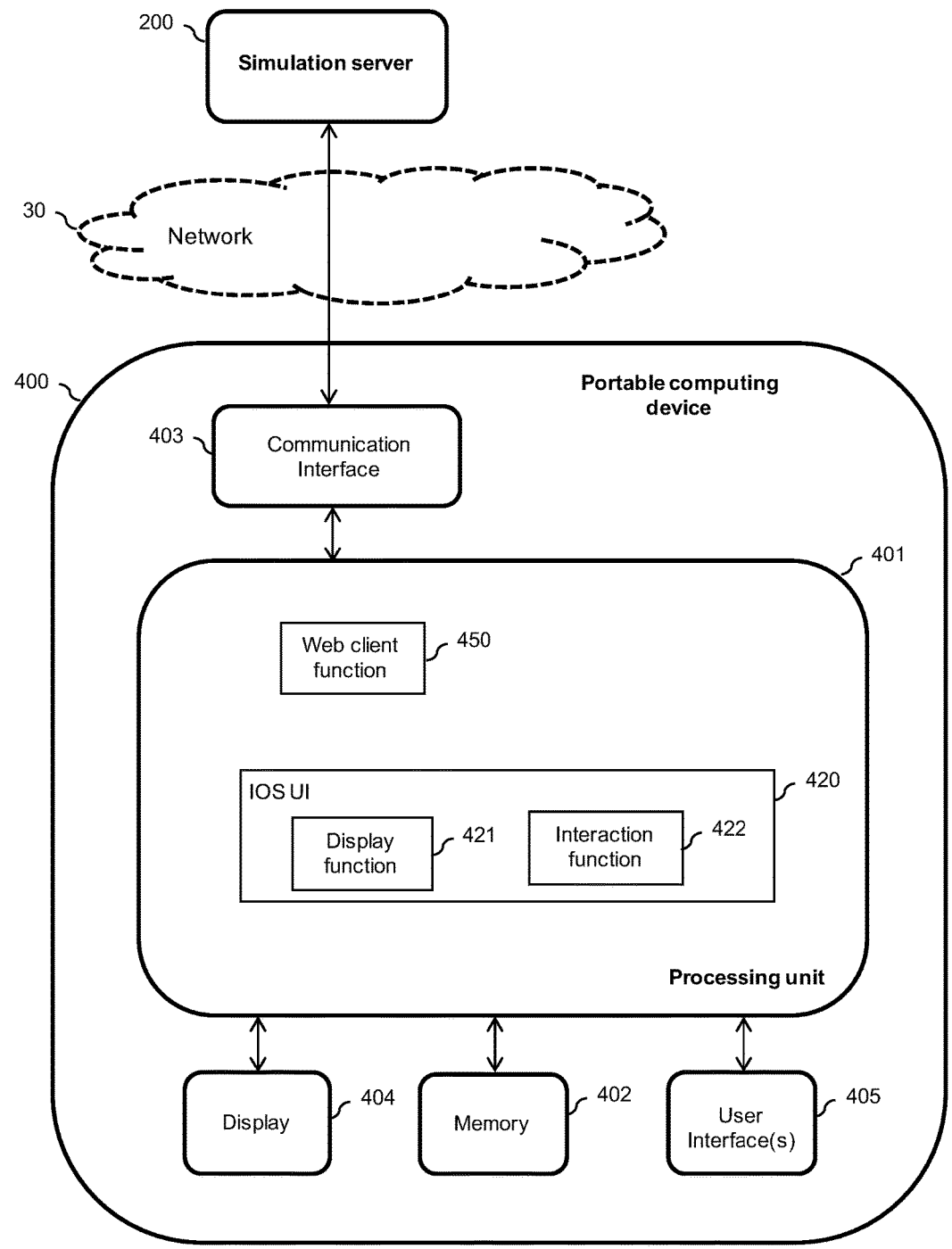

Referring now to FIGS. 3A, 3B and 3C, exemplary embodiments of components and functionalities of the simulation server 200, the simulator 300 and the portable computing device 400 are represented.

Referring more specifically to FIG. 3A, the simulation server 200 comprises a processing unit 201, having one or more processors (not represented in FIG. 3A for simplification purposes) capable of executing instructions of computer program(s). Each processor may further have one or several cores. The processing unit 201 implements functionalities of the simulation server 200 by executing computer program(s) instructions. The functionalities implemented by the processing unit 201 include the server simulation functionalities 210, the server IOS functionality 220 and the server GUI functionality 230.

The simulation server 200 comprises memory 202 for storing instructions of the computer program(s) executed by the processing unit 201, data generated by the execution of the computer program(s), data received via a communication interface 203, etc. The simulation server 200 may comprise several types of memories, including volatile memory, non-volatile memory, etc.

The simulation server 200 comprises the communication interface 203, for exchanging data with other devices, including one or more simulators 300 and/or one or more portable computing devices 400 via the network 30. The exchanged data comprise the IOS data 222, the GUI data 232 and the simulation data 212 represented in FIGS. 2A and 2B. The communication interface 203 supports one of more communication protocols, such as Wi-Fi, Ethernet, etc.

The simulation server 200 may comprise a display 204 (e.g. a regular screen or a tactile screen) for displaying data processed and/or generated by the processing unit 201. The simulation server 200 may also comprise one or more user interface 205 (e.g. a mouse, a keyboard, a trackpad, a touchscreen, etc.) for allowing a user to interact directly with the simulation server 200.

The server IOS functionality 220, the server simulation functionalities 210, and the server GUI functionality 230 are implemented by one or more computer programs. Each computer program comprises instructions for implementing the corresponding function when executed by the processing unit 201. The instructions are comprised in a non-transitory computer program product (e.g. memory 202). The instructions are deliverable via an electronically-readable media, such as a storage media (e.g. a USB key or a CD-ROM) or the network 30 (through the communication interface 203).

Referring more specifically to FIG. 3B, the simulator 300 comprises a processing unit 301, having one or more processors (not represented in FIG. 3B for simplification purposes) capable of executing instructions of computer program(s). Each processor may further have one or several cores. The processing unit 301 implements functionalities of the simulator 300 by executing instructions of the computer program(s). The functionalities implemented by the processing unit 301 include the simulator simulation functionalities 310, the simulator IOS UI 320 and the simulator GUI 330.

The simulator 300 comprises memory 302 for storing instructions of the computer program(s) executed by the processing unit 301, data generated by the execution of the computer program(s), data received via a communication interface 303, etc. The simulator 300 may comprise several types of memories, including volatile memory, non-volatile memory, etc.

The simulator 300 comprises the communication interface 303, for exchanging data with other devices, including the simulation server 200 via the network 30. The exchanged data comprise the IOS data 222, the GUI data 232 and the simulation data 212 represented in FIG. 2A. The communication interface 303 supports one of more communication protocols, such as Wi-Fi, Ethernet, etc.

The simulator comprises one or more actuators 306 for actuating physical component(s) of the simulator 300 (for example. actuating hydraulic cylinders for moving a simulated control cabin of an aircraft) under the control of the simulator simulation functionalities 310 executed by the processing unit 301.

The simulator 300 comprises one or more displays 304 (e.g. a regular screen or a tactile screen) for displaying data processed and/or generated by the processing unit 301. The simulator 300 also comprises one or more user interface 305 (e.g. traditional computer user interfaces as well as dedicated simulation user interfaces) for allowing users to interact with the simulator 300.

In a particular embodiment, the simulator IOS UI 320 includes a display function 321 and an interaction function 322. The display function 321 processes the IOS control and monitoring data 222 and the simulation data 212 of FIG. 2A, received from the simulation server 200 via the communication interface 303, and displays the processed IOS control and monitoring data 222 and simulation data 212 on the display 304.

The simulator IOS UI interaction function 322 generates the IOS interaction data 222 of FIG. 2A based on the interactions of the user 10 (via the user interface(s) 305) with the processed IOS control and monitoring data 222 displayed on the display 304. The IOS interaction data 222 are transmitted to the server IOS functionality 220 of the simulation server 200 through the communication interface 303.

The simulator GUI 330 may also include a display function and an interaction function, not represented in FIG. 3B for simplification purposes. The display function processes the GUI graphical data 232 and the server simulation data 212 of FIG. 2A, received from the simulation server 200 via the communication interface 303, and displays the processed GUI graphical data 232 and server simulation data 212 on the display 304.

The interaction function of the simulator GUI 330 generates the GUI interaction data 232 of FIG. 2A based on the interactions of the user 20 (via the user interface(s) 305) with the processed GUI graphical data 232 displayed on the display 304. The GUI interaction data 232 are transmitted to the server GUI functionality 230 of the simulation server 200 through the communication interface 303.

In another particular embodiment, the simulator simulation functionalities 310 include a display function 311 and an actuation function 312. The display function 311 processes simulation data 212 of FIG. 2A received from the simulation server 200 via the communication interface 303, and displays the processed simulation data on the display 304. The display function 311 can be used for displaying the simulation data 212 of FIG. 2A which cannot be displayed via the simulator IOS UI 320 or the simulator GUI 330.

The actuation function 312 processes other simulation data 212 of FIG. 2A which include actuation data, received from the simulation server 200 via the communication interface 303. The actuation function 312 processes the received actuation data and actuates a corresponding actuator 306. The actuation function 312 also generates feedback actuation data representative of a state of the actuated corresponding actuator 306. The feedback actuation data are transmitted to the simulation server 200 through the communication interface 303. More specifically, simulation data 212 of FIG. 2A comprising the feedback actuation data are transmitted to the server simulation functionalities 210 represented in FIG. 3A.

The simulator simulation functionalities 310, the simulator IOS UI 320, and the simulator GUI 320 are implemented by one or more computer programs. Each computer program comprises instruction for implementing the corresponding function when executed by the processing unit 301. The instructions are comprised in a non-transitory computer program product (e.g. memory 302). The instructions are deliverable via an electronically-readable media, such as a storage media (e.g. a USB key or a CD-ROM) or the network 30 (through the communication interface 303).

Referring more specifically to FIG. 3C, the portable computing device 400 comprises a processing unit 401, having one or more processors (not represented in FIG. 3C for simplification purposes) capable of executing instructions of computer program(s). Each processor may further have one or several cores. The processing unit 401 implements functionalities of the portable computing device 400 by executing instructions of the computer program(s). The functionalities implemented by the processing unit 401 include the portable computing device IOS UI 420.

The portable computing device 400 comprises memory 402 for storing instructions of the computer program(s) executed by the processing unit 401, data generated by the execution of the computer program(s), data received via a communication interface 403, etc. The portable computing device 400 may comprise several types of memories, including volatile memory, non-volatile memory, etc.

The portable computing device 400 comprises the communication interface 403, for exchanging data with other devices, including the simulation server 200 via the network 30. The exchanged data comprise the IOS data 222 and the simulation data 212 represented in FIG. 2B. The communication interface 403 supports one of more communication protocols, such as Wi-Fi, Ethernet, etc.

The portable computing device 400 comprises a display 404 (e.g. a regular screen or a tactile screen) for displaying data processed and/or generated by the processing unit 401. The portable computing device 400 also comprises at least one user interface 405 (e.g. a mouse, a keyboard, a trackpad, a touchscreen, etc.) for allowing a user (not represented in FIG. 3C) to interact with the portable computing device 400.

In a particular embodiment, the portable computing device IOS UI 420 includes a display function 421 and an interaction function 422. The display function 421 and interaction function 422 operate in a similar manner as the display function 321 and interaction function 322 represented in FIG. 3B.

The portable computing device IOS UI 420 is implemented by one or more computer programs. Each computer program comprises instruction for implementing the corresponding function when executed by the processing unit 401. The instructions are comprised in a non-transitory computer program product (e.g. memory 402). The instructions are deliverable via an electronically-readable media, such as a storage media (e.g. a USB key or a CD-ROM) or the network 30 (through the communication interface 403).

In an alternative embodiment not represented in the Figures for simplification purposes, the portable computing device 400 of FIG. 3C may correspond to the portable computing device 400' represented in FIG. 2B. The functionalities implemented by the processing unit 401 include the portable computing device GUI 430 of FIG. 2B in place of the portable computing device IOS UI 420. The data exchanged with the simulation server 200 comprise the GUI data 232 and the simulation data 212 of FIG. 2B.

In still another alternative embodiment not represented in the Figures for simplification purposes, the portable computing device 400 of FIG. 3C may be adapted for implementing both the portable computing device IOS UI 420 and the portable computing device GUI 430 illustrated in FIG. 2B. If user 10 is using the portable computing device 400, the portable computing device IOS UI 420 is executed by the processing unit 401. If user 20 is using the portable computing device 400, the portable computing device GUI 430 illustrated in FIG. 2B is executed by the processing unit 401.

In a particular aspect, the processing unit 201 of the simulation server 200 further executes a web server function 250, for implementing the exchange of data between the simulation server 200 and the simulator 300 or the portable computing devices 400. One of the users 10 or 20 (for example an instructor or a trainee) initiates a simulation web session between the web server function 250 and a web client implemented by the simulator 300 or portable computing devices 400, as will be detailed later in the description. Once the simulation web session is set up, data can be exchanged between the simulation server 200 and the simulator 300 or portable computing devices 400 via the web server function 250. The simulation data 212, the IOS data 222, and the GUI data 232 represented in FIGS. 2A and 2B are exchanged via the web server function 250.

In another particular aspect, the processing unit 201 of the simulation server 200 further executes at least one rendering function 240. Each instance of rendering function 240 is launched by the web server function 250, after the aforementioned simulation web session has been initiated, as will be detailed later in the description. Each instance of rendering function 240 generates data adapted for rendering on a specific destination device. For example, if the specific destination device is the portable computing device 400, data such as 2D or 3D simulation images may need to be adapted to the particular processing and display capabilities of the portable computing device 400. If the specific destination device is the simulator 300, these data may not need a specific adaptation for rendering on the simulator 300. Thus, data which do not need to be adapted are transmitted directly by the web server function 250, while data which need to be adapted (e.g. 2D or 3D simulation images) are processed by an instance of rendering function 240 for adaptation purposes. The adapted data may be transmitted by the rendering function 240 to a destination device. Alternatively, the adapted data are also transmitted via the web server function 250 to a destination device. For illustration purposes, in the rest of the description, the adapted data will be transmitted by the rendering function 240 to a destination device (e.g. portable computing device 400). Usually, some of the simulation data 212 represented in FIGS. 2A and 2B contain 2D or 3D simulation images such as maps, which need to be adapted by an instance of rendering function 240, in particular for transmission to a portable computing device 400 with limited processing capabilities, display capabilities, etc. However, some of the IOS data 222 and GUI data 232 represented in FIGS. 2A and 2B may also be adapted by an instance of rendering function 240 when needed.

The adaptation of a static 2D or 3D simulation image (or a flow of 2D or 3D simulation images) by an instance of rendering function 240 may consist in one of the following: encoding the simulation image(s) in a particular format (e.g. JPEG, GIF, TIFF, PNG, etc.), applying a particular compression algorithm to the simulation image(s), applying a particular image sampling algorithm to the simulation image(s), and applying a particular algorithm for lowering an image resolution of the simulation image(s).

Since at least some of the communications with the simulation server 200 are performed through the web server function 250, the processing unit 301 of the simulator 300 and the processing unit 401 of the portable computing device 400 respectively execute a web client function 350 and 450. The web client functions 350 and 450 are used for establishing the previously described simulation web session with the web server function 250 of the simulation server 200. The web client functions 350 and 450 are further used for exchanging data (e.g. simulation data 212, IOS data 222 and GUI data 232 represented in FIGS. 2A and 2B) with the web server function 250 of the simulation server 200. For instance, data transmitted by the web server function 250 to the simulator IOS UI 320 are received by the web client function 350, and forwarded to the simulator IOS UI 320. Data to be transmitted by the simulator IOS UI 320 to the simulation server 200 are transmitted to the web client function 350, which forwards them to the web server function 250. The use of a web client for exchanging data is well known in the art, and will not be further detailed in the rest of the description.

With respect to the adapted data transmitted by an instance of rendering function 240 of the simulation server 200, they are not received by a web client (e.g. 450 on the portable computing device 400), but received directly by the destination functionality (e.g. portable computing device IOS UI 420). A proprietary communication protocol using pre-defined or dynamically allocated communication sockets can be used for transmitting the adapted data, as is well known in the art.

For illustration purposes, the operations of the web server function 250 and the rendering functions 240 will now be detailed in the context of an exchange of data between the simulation server 200 and the portable computing device 400. In this context, some of the data transmitted by the simulation server 200 need to be adapted to the capabilities of the portable computing device 400 by one or more instances of rendering function 240, while other data can be transmitted directly via the web server function 250.

The data adapted for rendering on a particular destination device (e.g. portable computing device 400) usually consist in simulation data generated by the simulation functionalities 210 (e.g. 2D or 3D maps), and adapted by a particular instance of rendering function 240. For example, the aforementioned Navigation function of the server simulation functionalities 210 generates simulation data transmitted to a Navigation rendering function 240. The Navigation rendering function 240 adapts the simulation data (e.g. a navigation map) for rendering on the portable computing device 400, and transmits the adapted simulation data to the portable computing device 400. Similarly, the aforementioned Weather function of the server simulation functionalities 210 generates simulation data transmitted to a Weather rendering function 240. The Weather rendering function 240 adapts the simulation data (e.g. a weather map) for rendering on the portable computing device 400, and transmits the adapted simulation data to the portable computing device 400. A plurality of instances of rendering function 240 (e.g. Navigation and Weather rendering functions) can be simultaneously generating and transmitting adapted simulation data to the portable computing device 400. The display function 421 of the portable computing device IOS UI 420 receives and displays the simulation data which have been adapted and transmitted by the Navigation and Weather rendering functions 240.

The web server function 250 directly transmits data to the portable computing device 400, which do not need to be processed by one of the instances of rendering function 240. Such data usually include the IOS control and monitoring data 222 (e.g. a control web page) generated by the server IOS functionality 220, which are transmitted to the web server function 250, and further transmitted to the portable computing device 400. Such data may also include complementary simulation data generated by one of the server simulation functionalities 210. For instance, the Navigation function of the server simulation functionalities 210 generates complementary simulation data (e.g. parameters of the simulation such as wind speed, events of the simulation such as aircraft speed too high, etc.), which are transmitted to the web server function 250, and further transmitted to the portable computing device 400. The parameters and/or events can be displayed on the display 404 of the portable computing device 400 in the form of icons, text fields, etc. For instance, the parameters and/or events constitute additional simulation information displayed in complement of a Navigation map displayed on the display 404 of the portable computing device 400. The Navigation map has been generated by the Navigation rendering function 240 based on simulation data generated by the Navigation function of the server simulation functionalities 210, and transmitted to the portable computing device 400.

For example, the IOS function IOS_1 of the server IOS functionality 220 transmits IOS control and monitoring data 222 (e.g. a Navigation control web page) to the portable computing device 400 for controlling the execution of the Navigation function of the server simulation functionalities 210. The IOS control and monitoring data 222 are transmitted by the IOS function IOS_1 to the web server function 250, and further transmitted to the portable computing device 400 for display. The IOS control and monitoring data 222 are displayed by the display function 421 of the portable computing device IOS UI 420 on the display 404. User 10 interacts with the displayed IOS control and monitoring data 222 (e.g. the Navigation control web page) and the interaction function 422 of the portable computing device IOS UI 420 generates IOS interaction data 222. User 10 interacts via the user interface 405 (e.g. a keyboard, a mouse, a trackpad, a touch screen, etc.) of the portable computing device 400, and the IOS interaction data 222 are generated based on this interaction. The IOS interaction data 222 are transmitted by the portable computing device 400 to the web server function 250, and forwarded to the IOS function IOS_1. The IOS function IOS_1 processes the IOS interaction data 222 and controls the execution of the Navigation function of the server simulation functionalities 210 based on the processed IOS interaction data 222.

Simultaneously, the IOS function IOS_2 of the server IOS functionality 220 transmits IOS control and monitoring data 222 (e.g. a Weather control web page) to the portable computing device 400 for controlling the execution of the Weather function of the server simulation functionalities 210. The IOS control and monitoring data 222 are transmitted by the IOS function IOS_2 to the web server function 250, and further transmitted to the portable computing device 400 for display. The IOS control and monitoring data 222 are displayed by the display function 421 of the portable computer device IOS UI 420 on the display 404. User 10 interacts with the displayed control data (e.g. the Weather control web page) and the interaction function 422 of the portable computing device IOS UI 420 generates IOS interaction data 222. The IOS interaction data 222 are transmitted by the portable computing device 400 to the web server function 250, and forwarded to the IOS function IOS_2. The IOS function IOS_2 processes the IOS interaction data 222 and controls the execution of the Weather function of the server simulation functionalities 210 based on the processed IOS interaction data 222.

In a particular embodiment, a visual database (not shown in the Figures) may be used on the simulation server 200. The visual database contains data (e.g. terrain, buildings, 3D models, etc.) that can be streamed and displayed on the portable computing device 400, via one or more instances of rendering function 240. The visual database also contains parameters and/or events that can be overlaid on the displayed data, after direct transmission to the portable computing device 400 via the web server function 250.

Figure 4:
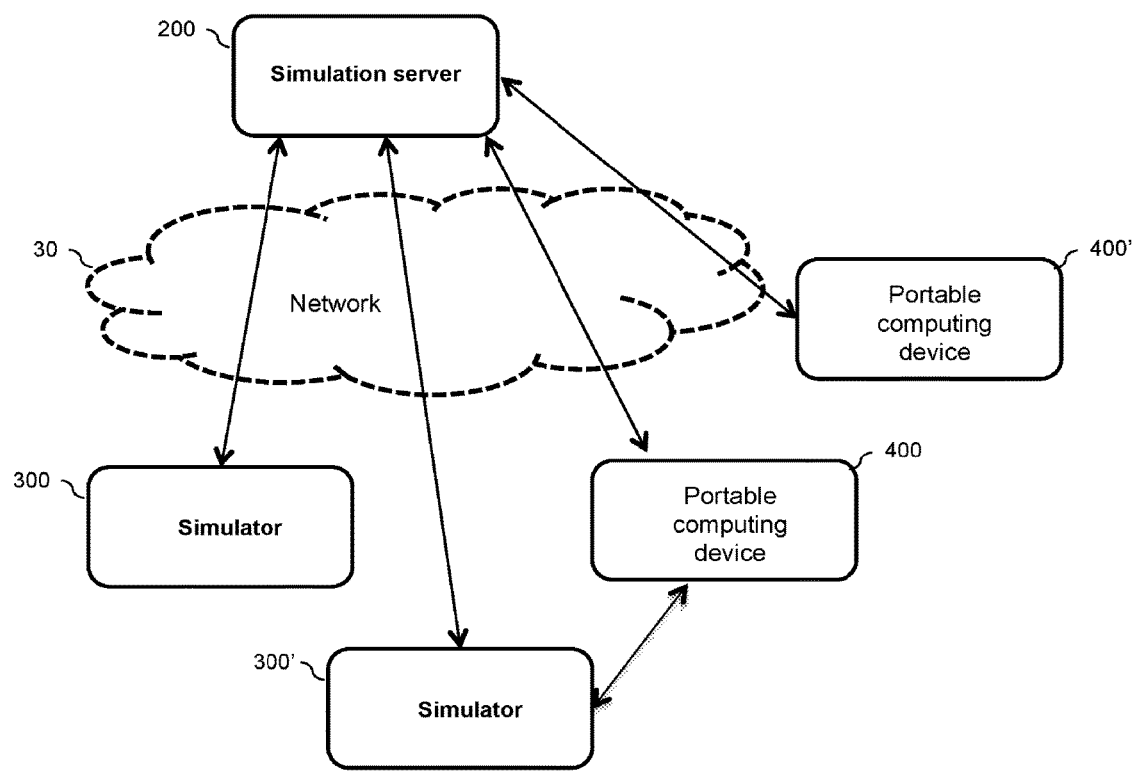
FIG. 4 illustrates a simulation server concurrently interacting with a plurality of simulators and portable computing devices.

Referring now simultaneously to FIGS. 3A and 4, FIG. 4 illustrates a single simulation server 200 supporting a plurality of simulators (e.g. 300 and 300'), and a plurality of computing devices (e.g. 400 and 400'). Although two simulators have been represented in FIG. 4, the simulation server 200 may support any number of simulators, based on its processing and communication capabilities. Similarly, although two portable computing devices have been represented in FIG. 4, the simulation server 200 may support any number of portable computing devices, based on its processing and communication capabilities.

For illustration purposes, the simulation server 200 executes a first simulation and a first user (a trainee in this particular instance) interacts with the first simulation via the simulator 300, while a second user (an instructor in this particular instance) interacts with the first simulation via the portable computing device 400. Simultaneously, the simulation server 200 executes a second simulation and a third user (another trainee) interacts with the second simulation via the simulator 300', while a fourth user (a second instructor) interacts with the second simulation via the portable computing device 400'.

For illustration purposes, the server simulation functionalities 210 of the simulation server 200 execute simultaneously a first instance of Weather function in relation to the first simulation, and a second instance of Weather function in relation to the second simulation. Each instance of Weather function generates simulation data (e.g. a weather map), which are respectively transmitted directly to the simulators 300 and 300', via the web server function 250, without using a rendering function 240. Although two instances of Weather function are mentioned in this example, a larger number of instances can be operating simultaneously on the simulation server 200.

For illustration purposes, the rendering functions 240 execute simultaneously a first instance of Weather rendering function in relation to the first simulation, and a second instance of Weather rendering function in relation to the second simulation. Each instance of Weather function executed by the server simulation functionalities 210 generates simulation data (e.g. the weather map), which are respectively adapted by the instances of Weather rendering function, before transmission to the portable computing devices 400 and 400'. Although two instances of Weather rendering function are mentioned in this example, a larger number of instances can be operating simultaneously on the simulation server 200. The adapted simulation data transmitted to the portable computing devices 400 and 400' may differ, based on specific characteristics of each of the portable computing devices 400 and 400'. For instance, a Weather map with a better resolution may be generated for the portable computing devices 400 than for the portable computing device 400'.

For illustration purposes, the server IOS functionality 220 executes simultaneously a first and a second instance of the IOS function IOS_2 for respectively controlling the first and second instances of Weather function executed by the server simulation functionalities 210. The first instance of IOS function IOS_2 transmits IOS control and monitoring data 222 (e.g. a Weather control web page) to the portable computing device 400 for controlling the execution of the first instance of Weather function. The control data are transmitted by the first instance of IOS function IOS_2 to the web server function 250, and further transmitted to the portable computing device 400 for display. IOS Interaction data 222 are generated and transmitted by the portable computing device 400 to the web server function 250, and forwarded to the first instance of IOS function IOS_2. The first instance of IOS function IOS_2 processes the IOS interaction data 222 and controls the execution of the first instance of Weather function executed by the server simulation functionalities 210, based on the processed IOS interaction data 222.

The second instance of IOS function IOS_2 transmits IOS control and monitoring data 222 (e.g. a Weather control web page) to the portable computing device 400' for controlling the execution of the second instance of Weather function executed by the server simulation functionalities 210. The control data are transmitted by the second instance of IOS function IOS_2 to the web server function 250, and further transmitted to the portable computing device 400' for display. IOS Interaction data 222 are generated and transmitted by the portable computing device 400' to the web server function 250, and forwarded to the second instance of IOS function IOS_2. The second instance of IOS function IOS_2 processes the IOS interaction data 222 and controls the execution of the second instance of Weather function executed by the server simulation functionalities 210, based on the processed IOS interaction data 222. Although two instances of IOS function IOS_2 are mentioned in this example, a larger number of instances can be operating simultaneously on the simulation server 200.

Alternatively, the server simulation functionalities 210 may execute simultaneously an instance of Weather function in relation to the first simulation, and an instance of Navigation function in relation to the second simulation. Each instance of Weather and Navigation function executed by the server simulation functionalities 210 generates simulation data (e.g. a weather map and a navigation map), which are respectively transmitted directly to the simulators 300 and 300', via the web server function 250. The rendering functions 240 execute simultaneously an instance of Weather rendering function in relation to the first simulation, and an instance of Navigation rendering function in relation to the second simulation. Each instance of Weather and Navigation function executed by the server simulation functionalities 210 generates simulation data (e.g. the weather map and the navigation map), which are respectively adapted by the instances of Weather and Navigation rendering function, before transmission to the portable computing devices 400 and 400'.

In this case, the server IOS functionality 220 executes simultaneously an instance of IOS function IOS_1 and an instance of IOS function IOS_2, for respectively controlling the instances of Navigation and Weather function executed by the server simulation functionalities 210. The instances of IOS function IOS_1 and IOS function IOS_2 operate as previously described with respect to the portable computing devices 400 and 400'.

In a similar manner, the server GUI functionality 230 executes simultaneously a first instance of the server GUI functionality 230 in relation to the first simulation, and a second instance of the server GUI functionality 230 in relation to the second simulation. Each instance of the server GUI functionality 230 generates GUI graphical data 232, which are respectively transmitted to the simulators 300 and 300', via the web server function 250. Each instance of server GUI functionality 230 also receives, via the web server function 250, GUI interaction data 232 which are respectively transmitted by the simulators 300 and 300'. The simulator GUI 330 displays the GUI graphical data 232 received from the simulation server 200 on the simulators 300 and 300', and generates the GUI interaction data 232 based on the interactions of the users 20 with the displayed GUI graphical data 232. Each instance of the server GUI functionality 230 on the simulation server 200 processes the GUI interaction data 232 transmitted by the simulators 300 and 300', and respectively controls the execution of the first and second instance of the simulation, based on the processed GUI interaction data 232. Simulation data generated by the server simulation functionalities 210 are also transmitted directly by the web server function 250 (without adaptation by a rendering function 240) to the simulators 300 and 300', for display by the simulator GUI 330.

In an alternative embodiment, the web server function 250 is executed by a dedicated processing unit of the simulation server 200 (not represented in the Figures) different from the processing unit 201.

In another alternative embodiment, several instances of the web server function 250 are executed by the processing unit 201. For example, an instance is dedicated to the server IOS functionality 220, an instance is dedicated to the server simulation functionalities 210 and an instance is dedicated to the server GUI functionality 230. As mentioned previously, at least some of the instances may be executed by a dedicated processing unit different from the processing unit 201.

In still another alternative embodiment, the web server function 250 is not implemented on the simulation server 200, but on a standalone server not represented in the Figures.

Figure 6A:
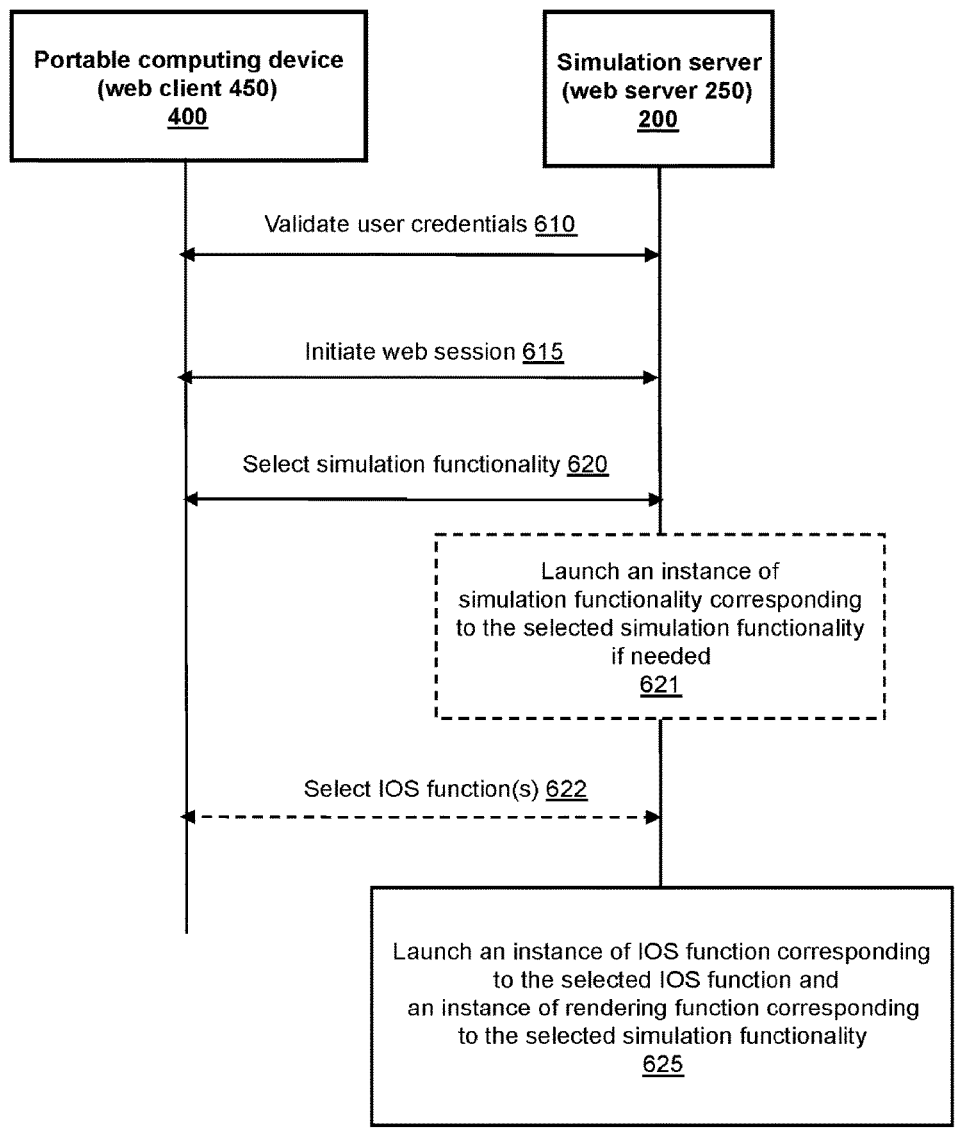
FIGS. 6A, 6B and 6C represent an exemplary flow diagram illustrating interactions between components of the simulation server of FIG. 3A and the portable computing device of FIG. 3C.
Figure 6B:
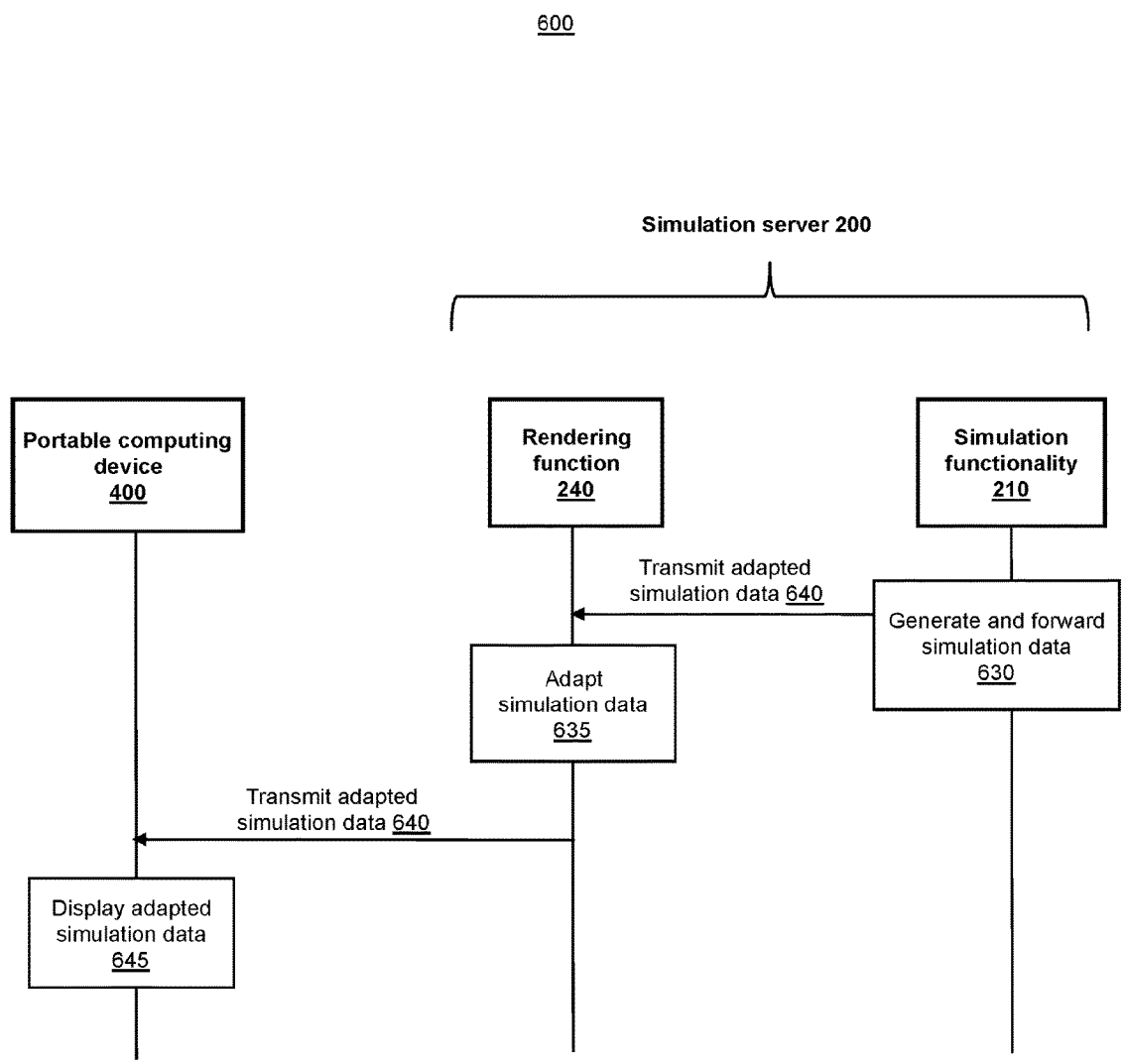
Figure 6C:
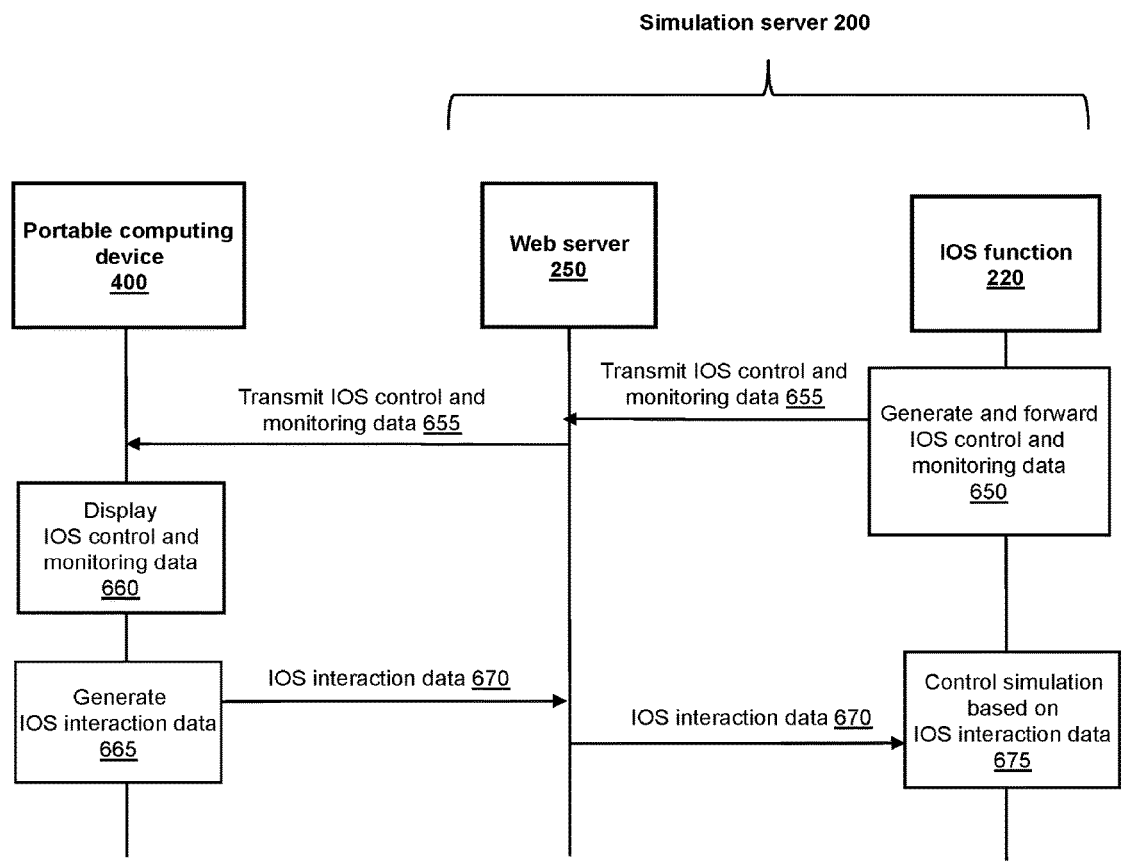

Reference is now made concurrently to FIGS. 3A, 3B, 3C, 6A, 6B and 6C, where FIGS. 6A, 6B and 6C represent an exemplary flow diagram 600 illustrating interactions between the portable computing device 400 and components of the simulation server 200. More precisely, this exemplary flow diagram 600 illustrates interactions of the portable computing device IOS UI 420 with the simulation server 200.

At step 610, the user of the portable computing device 400 performs an authentication by entering its credentials, and the portable computing device web client function 450 transmits the credentials to the web server function 250. The web server function 250 verifies if the user is authorized to connect to the simulation portal based on the user credentials, and grants/denies access to the simulation portal based on the result of the verification of the user credentials. This step is optional, but is usually implemented to avoid that any user is granted access to the simulation portal without restrictions. An administrator of the simulation portal may be granted access to management functionalities of the portal, while standard users generally only have access to simulation functionalities of the portal.

At step 615, the portable computing device web client function 450 initiates a simulation web session with the web server function 250. For example, the user of the portable computing device 400 enters a Uniform Resource Locator (URL) corresponding to a simulation portal hosted by the web server function 250, and the portable computer device web client function 450 requests a connection to the simulation server 200, hereinafter referred as the simulation portal. In return, the web server function 250 returns a home page of the simulation portal to be displayed by the portable computing device web client function 450.

At step 620, the web server function 250 transmits a list of candidate server simulation functionalities 210 (e.g. Weather function, Navigation function, etc.) to the portable computing device web client function 450. The list may be determined based on a particular profile of the user, and may comprise only a subset (e.g. Weather function only) of all available server simulation functionalities 210 supported by the web server function 250. The subset corresponds to server simulation functionalities 210 (e.g. Weather function only) that the user of the portable computing device 400 is authorized to use based on its profile. For each user, the web server function 250 stores a profile of the user for determining the corresponding authorized server simulation functionalities 210. The profile of each user can be generated by an administrator of the web server function 250. For example, in the case of an aircraft simulation, the user may only be authorized to use server simulation functionalities 210 corresponding to one or more particular type(s) of aircraft, to one or more particular system(s) or sub-system(s) of an aircraft, to military or civilian aircrafts only, etc. The portable computing device web client function 450 displays the list of candidate server simulation functionalities 210 (e.g. Weather function and Navigation function) for allowing the user to select one among the list of candidates. The selection of a particular server simulation functionality (e.g. Weather function) in the list of candidate server simulation functionalities 210 by the user is transmitted to the web server function 250 function by the portable computing device web client function 450. Alternatively, a plurality of candidate server simulation functionalities 210 can be selected simultaneously.

At step 621, the web server function 250 determines if an instance of the selected server simulation functionality 210 (e.g. Weather function) is already running, and if it is not the case, launches such an instance. Since the simulation server 200 can support a plurality of simulation sessions in parallel, a server simulation functionality 210 (e.g. Weather function) may have several instances running in parallel for different independent simulation sessions. Thus, before executing step 620, the user may need to join an existing simulation session or create a new simulation session. The creation of/joining to a simulation session is performed through interactions between the portable computing device web client function 450 and the web server function 250. Each independent simulation session is allocated a unique identifier and information describing the characteristics of the simulation session, so that any portable computing device 400 or simulator 300 can join the proper ongoing simulation session based on its characteristics (e.g. type of aircraft simulated, simulator 300 used for the simulation, etc.).

The selected server simulation functionality 210 (e.g. Weather function) may automatically provide access to corresponding IOS function(s) of the server IOS functionality 220 (e.g. IOS function IOS_2). Alternatively, an interactive selection step 622 similar to selection step 620 is performed. At step 622, the web server function 250 transmits a list of candidate IOS function(s) of the server IOS functionality 220 (e.g. IOS function IOS_1, IOS function IOS_2, etc.) to the portable computing device web client function 450. The list may be determined based on a particular profile of the user, and may comprise only a subset (e.g. IOS function IOS_2 only) of all available server IOS functions supported by the web server function 250. The subset corresponds to server IOS functions 220 (e.g. IOS function IOS_2 only) that the user of the portable computing device 400 is authorized to use based on its profile. For each potential user, the web server function 250 stores a profile of the user for determining the corresponding authorized server IOS functions 220. The portable computing device web client function 450 displays the list of candidate server IOS functions 220 (e.g. IOS function IOS_1 and IOS function IOS_2) for allowing the user to select one among the list of candidates. The selection of server IOS functions 220 (e.g. IOS function IOS_2) in the list of candidate server IOS functions by the user is transmitted to the web server function 250 by the portable computing device web client function 450. Alternatively, a plurality of candidate server IOS functions 220 can be selected simultaneously.

At step 625, the web server function 250 launches an instance of server IOS function 220 corresponding to the IOS function (e.g. IOS_2) selected at step 622. The web server function 250 also launches an instance of server rendering function 240 (e.g. Weather rendering function) corresponding to the server simulation functionality 210 (e.g. Weather function) selected at step 620. As mentioned previously, several instances of the same server IOS function 210 or server rendering function 240 can be executed in parallel by the simulation server 200, for supporting a plurality of simulation sessions running in parallel, and also for supporting a plurality of portable computing devices 400 participating in parallel to the same or similar simulation sessions. Furthermore, a single portable computing device 400 may be interacting with a plurality of server IOS functions 210 and/or a plurality of server rendering functions 240 in parallel.

The web server function 250 establishes a first communication channel for exchanging data between the portable computing device 400 and the instance of server IOS function 220 (e.g. IOS function IOS_2) launched at step 625; and optionally between the portable computing device 400 and the instance of server simulation functionality 210 (e.g. Weather function) launched at step 621 (to directly transmit simulation data which do not need to be adapted by a rendering function). The data are exchanged between the simulation server 200 and the portable computing device 400 through the web server function 250 and the portable computing device web client 450. All the data exchanged through this first communication channel do not need to be adapted for rendering on the portable computing device 400 via a server rendering function 240.

The web server function 250 establishes a second communication channel between the instance of server rendering function 240 (e.g. Weather rendering function) launched at step 625 and the portable computing device 400, for transmitting simulation data adapted for rendering on the portable computing device 400. Establishing this second communication channel is well known in the art, and may comprise determining a connection identification, selecting communication protocol(s), allocating communication sockets, etc.

The web server function 250 may create and manage a dynamic communication profile for each portable computing device 400, comprising characteristics of the created first and second communication channels. The management of the dynamic communication profile includes creation/update/deletion of the first and second communication channels.

Furthermore, the web server function 250 provides the launched instance of server rendering function 240 with characteristics of the portable computing device 400. The characteristics include for example processing power, memory size, display resolution, data throughput of a communication interface, available user interfaces, etc. These characteristics are used by the launched instance of server rendering function 240 for performing the adaptation of the simulation data transmitted to the portable computing device 400. For each authorized user of the simulation portal, the web server function 250 may store a static profile (with the aforementioned characteristics) of the portable computing device 400 used by the user. Alternatively, the web server function 250 automatically generates a dynamic profile (with the aforementioned characteristics) of the portable computing device 400 used by the user at step 610, by dynamically retrieving the characteristics of the device 400 currently used by the user (this procedure is well known in the art of web browsing).

FIG. 6B more specifically represents the transmission of adapted simulation data by the instance of server rendering function 240 to the portable computing device 400.

At step 630, the instance of server simulation functionality 210 (e.g. Weather function) generates simulation data and forwards the simulation data to the corresponding instance of server rendering function 240 (e.g. Weather rendering function).

At step 635, the instance of server rendering function 240 processes the simulation data, and generates simulation data adapted (based on the aforementioned characteristics of the portable computing device 400) for rendering on the portable computing device 400.

At step 640, the adapted simulation data are transmitted directly by the instance of server rendering function 240 to the portable computing device 400 (without using the web server function 250).

At step 645, the display function 421 of the portable computing device IOS UI 420 processes the adapted simulation data received from the instance of server rendering function 240, and displays the processed simulation data on the display 404 of the portable computing device 400. Since the simulation data have been adapted to the device 400 at step 635, the processing is very limited and may even not be needed before displaying the simulation data.

Although a single sequence of steps 630, 635, 640 and 645 is represented in FIG. 6B for simplification purposes, a plurality of sequences may occur. For each sequence, simulation data adapted for rendering on the portable computing device 400 are generated at steps 630 and 635, transmitted at step 640 and displayed at step 645.

FIG. 6C more specifically represents the exchange of data not adapted by a server rendering function 240 between the web server function 250 and the portable computing device 400.

At step 650, the instance of server IOS function 220 (e.g. IOS_2) generates IOS control and monitoring data 222 (not adapted by a rendering function), and forwards the IOS control and monitoring data 222 to the web server function 250.

At step 655, the IOS control and monitoring data 222 are transmitted by the web server function 250 to the portable computing device 400 (without applying any rendering function).

At step 660, the display function 421 of the portable computing device IOS UI 420 displays the received IOS control and monitoring data 222 on the display 404 of the portable computing device 400.

At step 665, the interaction function 422 of the portable computing device IOS UI 420 generates IOS interaction data 222 based on interactions of the user of the portable computing device 400 (e.g. with the IOS control and monitoring data 222 displayed at step 660).

At step 670, the IOS interaction data 222 are transmitted by the portable computing device 400 to the web server function 250. The web server function 250 simply forwards the IOS interaction data 222 to the instance of server IOS function 220 (e.g. IOS_2).

The web server function 250 may implement a filtering function (not represented in the Figures), for identifying and adequately handling the data received from the portable computing device(s) 400. The filtering function identifies IOS interaction data 222 received at step 670, which shall be forwarded to the proper instance of server IOS function 220 (e.g. IOS_2). The filtering function also identifies administrative and management data received at steps 610, 615, 620 and 622 of FIG. 6A, which shall be processed directly by the web server function 250.

At step 675, the instance of server IOS function 220 (e.g. IOS_2) processes the IOS interaction data 222 to control the execution of the simulation executed by the simulation server 200 based on the IOS interaction data 222.

Although a single sequence of steps 650, 655 and 660 is represented in FIG. 6C for simplification purposes, a plurality of sequences may occur. Similarly, a plurality of sequences of steps 665, 670 and 675 may occur. A plurality of sequences of steps 650, 655 and 660 may occur before a single sequence of steps 665, 670 and 675 occurs. Similarly, a plurality of sequences of steps 665, 670 and 675 may occur before a single sequence of steps 650, 655 and 660 occurs. However, a sequence of steps 665, 670 and 675 is generally followed by a sequence of steps 650, 655 and 660 (and/or steps 630, 635, 640 and 645 of FIG. 6B); since the processing of the IOS interaction data 222 impacts the execution of the simulation executed by the simulation server 200, which in turn leads to the generation of new adapted simulation data 212/IOS control and monitoring data 222 which are transmitted to the portable computing device 400.

Although not represented in FIG. 6C for simplification purposes, steps 650, 655 and 660 may also consist in the generation by the instance of server simulation functionality 210 represented in FIG. 6B of simulation data which do not need to be adapted by a rendering function, the transmission of these simulation data to the portable computing device 400 directly by the web server function 250, and the display of these simulation data on the portable computing device 400

Furthermore, the transmission of simulation data adapted by the instance of server rendering function 240 as illustrated in FIG. 6B, and the transmission of IOS control and monitoring data 222/simulation data 212 by the web server function 250 (without adaptation by a rendering function) as illustrated in FIG. 6C, occur simultaneously and independently.

As is well known in the art, the communications between the web server function 250 and the portable computing device web client 450 use the Hypertext Transfer Protocol (HTTP) and/or Hypertext Transfer Protocol Secure (HTTPS). Optionally, the Real-time Transport Protocol (RTP) may also be used for some of the data exchanged between the web server function 250 and portable computing device(s) 400. A single step represented in FIGS. 6A and 6C (e.g. 610, 615, 620, 622, 655 and 670) may include a plurality of HTTP/HTTPS/RTP messages exchanged between the web server function 250 and portable computing device(s) 400.

Similarly, the communications between the instances of server rendering function 240 and portable computing device(s) 400 may also use the HTTP and/or HTTPS and/or RTP protocols. A single step represented in FIG. 6B (e.g. 640) may include a plurality of HTTP/HTTPS/RTP messages exchanged between the instances of server rendering function 240 and portable computing device(s) 200. In this case, each instance of server rendering function 240 implements an autonomous HTTP based server allowing communications with the portable computing device(s) 400 via web sockets. The establishment of the communication channel between the instances of server rendering function 240 and portable computing device(s) 400 is performed under the direction of the web server function 250 at step 625. However, this communication channel is not limited to the use of the HTTP and/or HTTPS and/or RTP protocols, but may use other non-web-based communication protocols (e.g. a proprietary communication protocol).

The flow diagram 600 is for illustration purposes only. A similar flow diagram may be adapted to illustrate interactions of the portable computing device GUI 430 represented in FIG. 2B, with the simulation server 200. Additionally, similar flow diagrams may be respectively adapted to illustrate interactions of the simulator IOS UI 320, simulator GUI 330 and simulator simulation functionalities 310 executed on the simulator 300 represented in FIG. 2A, with the simulation server 200.

Figure 5:
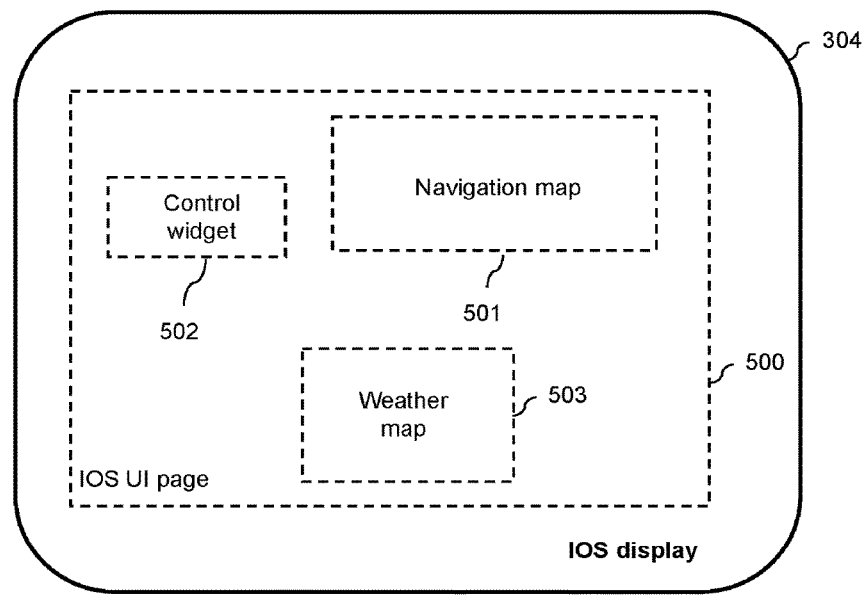
FIG. 5 illustrates respective displays of the simulator and portable computing device of FIGS. 3B and 3C.
Figure 5:
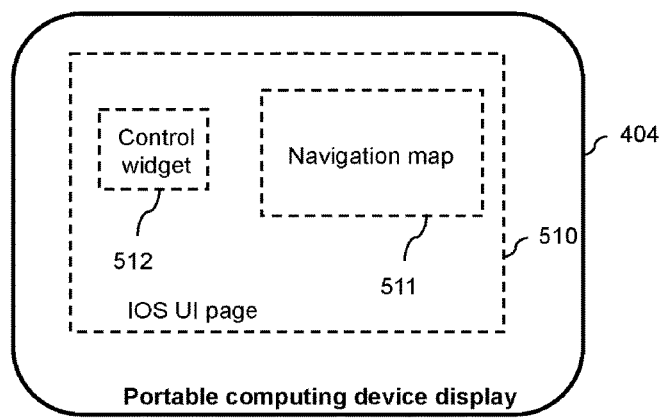

Reference is now made concurrently to FIGS. 3A, 3B, 3C and 5. FIG. 5 represents an IOS UI page 500 displayed on the display 304 of the simulator 300. The IOS UI page 500 is displayed by the display function 321 of the simulator IOS UI 320. The IOS UI page 500 provides a user interface with sub-groups of instances. The IOS UI page 500 generally includes graphical control elements (e.g. menus and sub-menus, list boxes, etc.) for controlling simulation parameters, and graphical display elements (e.g. images, text fields, icons, embedded videos, etc.) for displaying simulation data generated by the server simulation functionalities 210.

The IOS UI page 500 represented in FIG. 5 comprises a first image 501 (Navigation map), a graphical control element 502 (control widget), and a second image 503 (Weather map). The Navigation map is generated by the Navigation function of the server simulation functionalities 210, and directly transmitted (without adaptation by the server rendering function 240) to the simulator IOS UI 320 via the web server function 250, for display on the simulator display 304 by the simulator display function 321. The Navigation map is updated based on the execution of the Navigation function of the server simulation functionalities 210. The Weather map 503 is generated by the Weather function of the server simulation functionalities 210, and directly transmitted (without adaptation by the server rendering function 240) to the simulator IOS UI 320 via the web server function 250, for display on the simulator display 304 by the simulator display function 321. The Weather map is updated based on the execution of the Weather function of the server simulation functionalities 210.

The web server function 250 receives IOS control and monitoring data 222 corresponding to the control widget 502 (allowing control of the Navigation map 501 and Weather map 503) from the server IOS functionality 220. The IOS control and monitoring data 222 are transmitted to the simulator 300 by the web server function 250, and the control widget 502 is displayed on the simulator display 304 by the simulator display function 321 of the simulator IOS UI 321 based on the received IOS control and monitoring data 222. The control widget 502 is used by a user for modifying parameters related to the Navigation map 501 and the Weather map 503, when the user interacts with the simulator 300 via the interaction function 322 of the simulator IOS UI 320. IOS Interaction data 222 comprising the modified parameters are transmitted by the interaction function 322 of the simulator IOS UI 320 to the server IOS functionality 220, for controlling the execution of the Navigation and Weather functions of the server simulation functionalities 210.

FIG. 5 also represents an IOS UI page 510 displayed on the display 404 of the portable computing device 400. The IOS UI page 510 is displayed by the portable computing device display function 421 of the portable computing device IOS UI 420. The IOS UI page 510 comprises an image 511 (Navigation map) corresponding to the Navigation map 501 of the IOS UI page 500, and a graphical control element 512 (control widget) corresponding to the control widget 502 of the IOS UI page 500.

For illustration purposes, the user of the portable computing device 400 has decided not to use the Weather function of the server simulation functionalities 210, and consequently an image corresponding to the Weather map 503 of the IOS UI page 500 is not displayed on the display 404 of the portable computing device 400. In an alternative use case not represented in FIG. 5, if the user of the portable computing device 400 had decided to use the Weather function of the server simulation functionalities 210, an image corresponding to the Weather map 503 of the IOS UI page 500 would be displayed on the portable computing device display 404.

On the simulation server 200, an instance of Navigation rendering function 240 receives simulation data corresponding to the Navigation map 511 from the Navigation function of the server simulation functionalities 210. The instance of Navigation rendering function 240 processes the simulation data to generate the Navigation map 511 adapted for rendering on the portable computing device 400. For example, the size and resolution of the Navigation map 511 is adapted to characteristics (e.g. screen resolution, etc.) of the portable computing device 400. The Navigation map 511 is transmitted to the portable computing device 400 by the instance of server rendering function 240, and displayed on the portable computing device display 404 by the portable computer device IOS UI 421.

The web server function 250 at the simulation server 200 receives IOS control and monitoring data 222 corresponding to the control widget 512 (allowing control of the Navigation map 511) from the server IOS functionality 220. The IOS control and monitoring data 222 are transmitted to the portable computing device 400 by the web server function 250, and the control widget 512 is displayed on the portable computing device display 404 by the portable computing device IOS UI 421 based on the received IOS control and monitoring data 222.

When the user 10 interacts with the IOS UI page 510 via a user interface 405 of the portable computing device 400, corresponding IOS interaction data 222 are generated by the interaction function 422 of the portable computing device IOS UI 420, and transmitted by the interaction function 422 to the web server function 250 of the simulation server 200. The web server function 250 forwards the IOS interaction data 222 to the server IOS functionality 220.

For example, the control widget 512 is a menu comprising three items. When the user positions a pointer (corresponding to a mouse) on one of the items and left clicks, the transmitted IOS interaction data 222 comprise the selected item.

Alternatively or complementarity, the user 10 may interact directly with an area of the IOS UI page 510 without using the control widget 512. For example, the user 10 may position a pointer (corresponding to a mouse) on the Navigation map 511, and left click or right click on the Navigation map 511. The transmitted IOS interaction data 222 comprise an indication that the user 10 interacted with the Navigation map 511, and more specifically via a right-click or a left-click. The IOS interaction data 222 are interpreted by the server IOS functionality 220 at the simulation server 200 as follows: a left-click is a zoom-in request and a right-click is a zoom-out request. The server IOS functionality 220 reconfigures the Navigation function of the server simulation functionalities 210 accordingly. In case of a zoom-in, the Navigation function of the server simulation functionalities 210 generates more detailed simulation data, which are processed by the instance of Navigation server rendering function 240 for generating a zoomed-in Navigation map 511 for rendering on the portable computing device 400. In case of a zoom-out, the Navigation function of the server simulation functionalities 210 generates less detailed simulation data, which are processed by the instance of Navigation server rendering function 240 for generating a zoomed-out Navigation map 511 for rendering on the portable computing device 400.

More generally, the IOS interaction data 222 are used by the server IOS functionality 220 for controlling the corresponding server simulation functionality 210 (e.g. Navigation function). Controlling the corresponding server simulation functionality 210 includes controlling the simulation data generated by the server simulation functionality 210 (e.g. Navigation function), which are further adapted by the corresponding instance of server rendering function 240 (e.g. instance of Navigation server rendering function 240) for rendering (e.g. Navigation map 511) on the portable computing device display 404.

The web server function 250 may pre-process the received IOS interaction data 222 to determine if they correspond to a legitimate interaction with the IOS UI page 510 displayed on the portable computing device 400. The web server function 250 simply discards transmitted IOS interaction data 222 which do not correspond to a legitimate interaction with the IOS UI page 500, and transmits legitimate interactions to the server IOS functionality 220. The web server function 250 may further discriminate the IOS interaction data 222 generated with the IOS UI page 510, from other types of data (e.g. administration and configuration of the simulation server 200) which are processed directly by the web server function 250.

Transmission of IOS Filtered Information

Referring now concurrently to FIGS. 7A, 7B, 7C, 7D, 8 and 9, a transmission of IOS filtered information from a portable computing device to a destination computing device is illustrated. The filtering of the IOS information is based on user access rights of a user who is the destination of the transferred IOS filtered information.

Figure 7A:
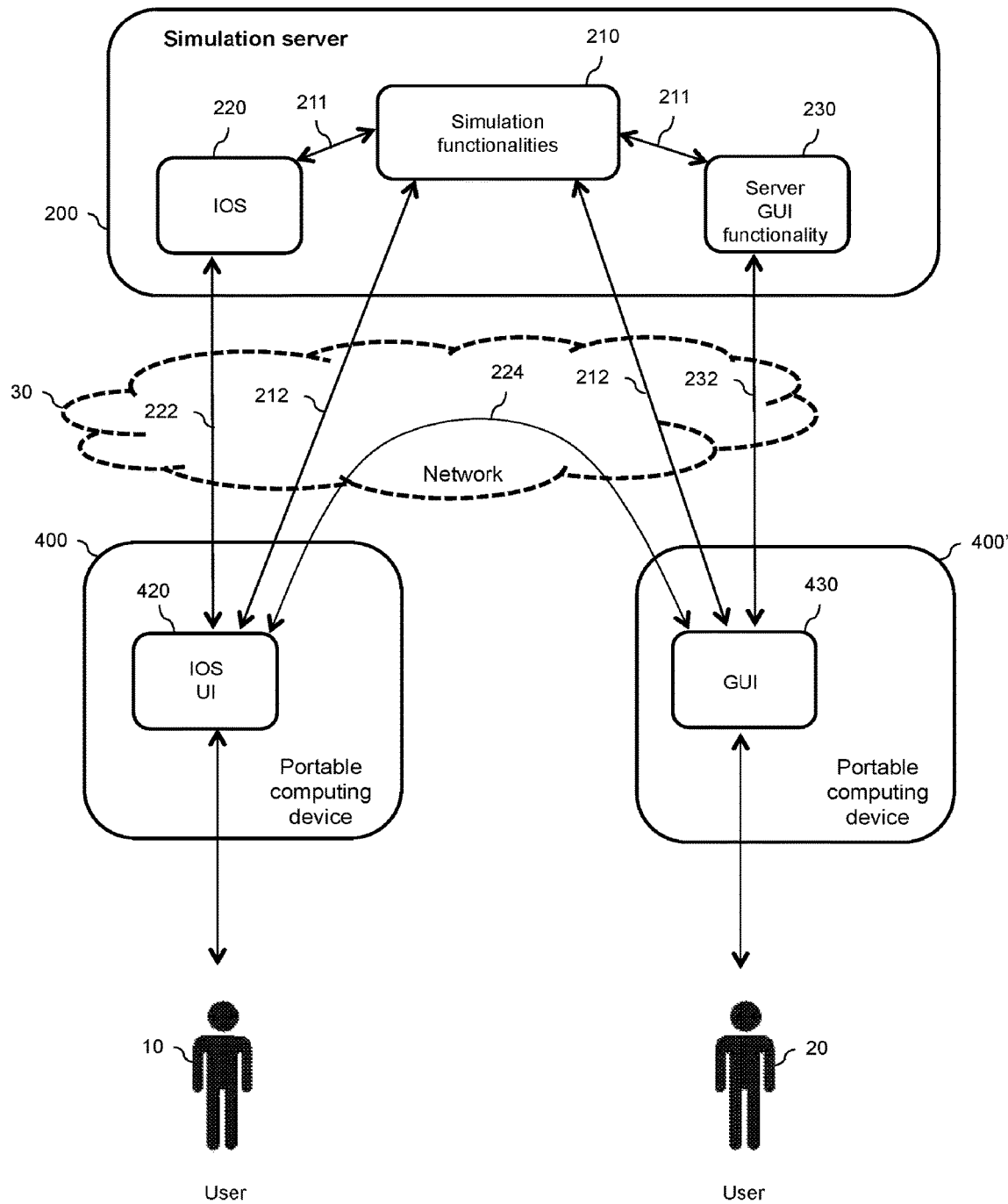
FIGS. 7A, 7B, 7C and 7D illustrate the transmission of Instructor Operating Station (IOS) filtered information by the portable computing device of FIG. 3C.
Figure 8:
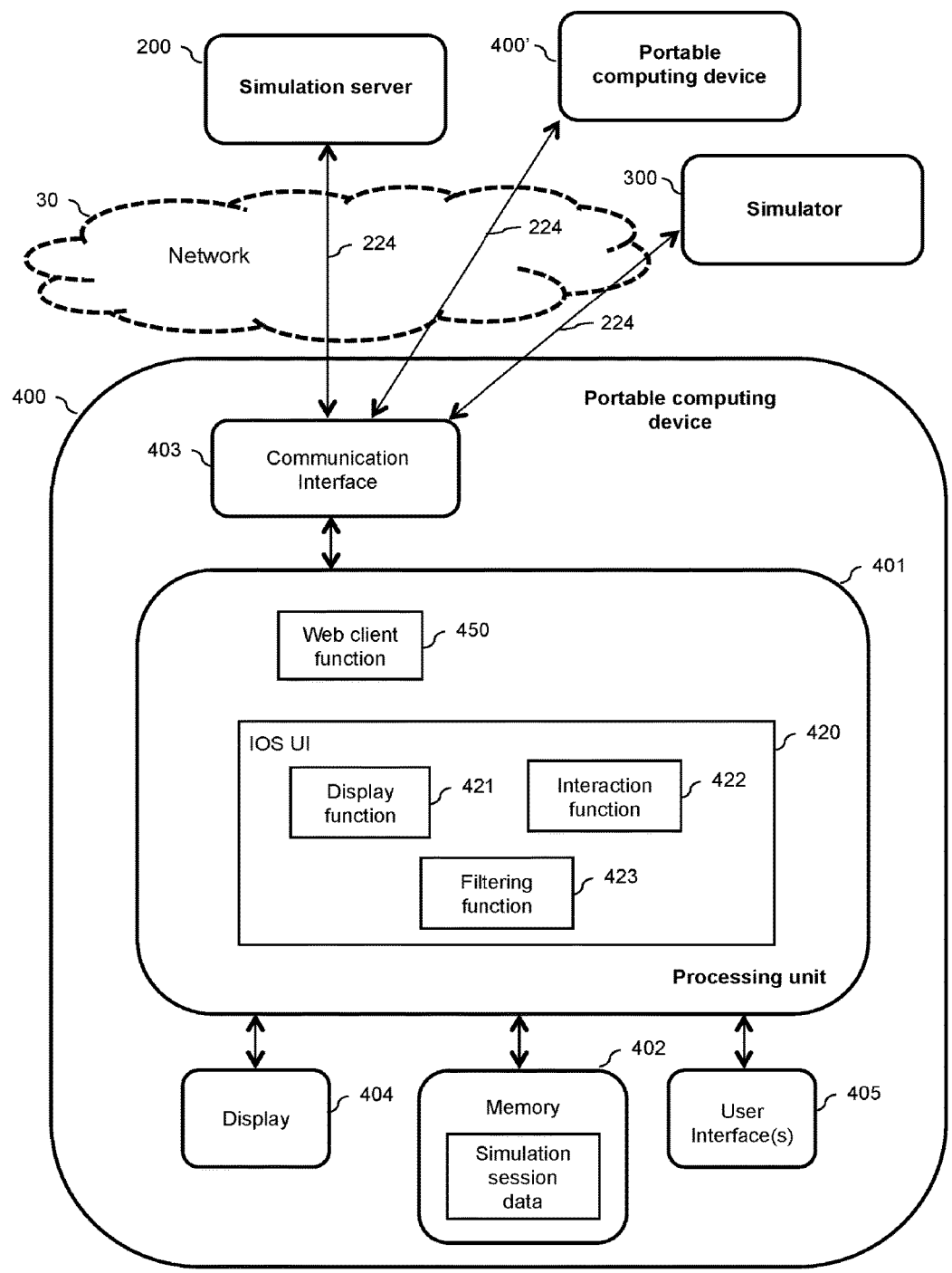
FIG. 8 represents the portable computing device of FIG. 3C adapted for the transmission of IOS filtered information.
Figure 9:
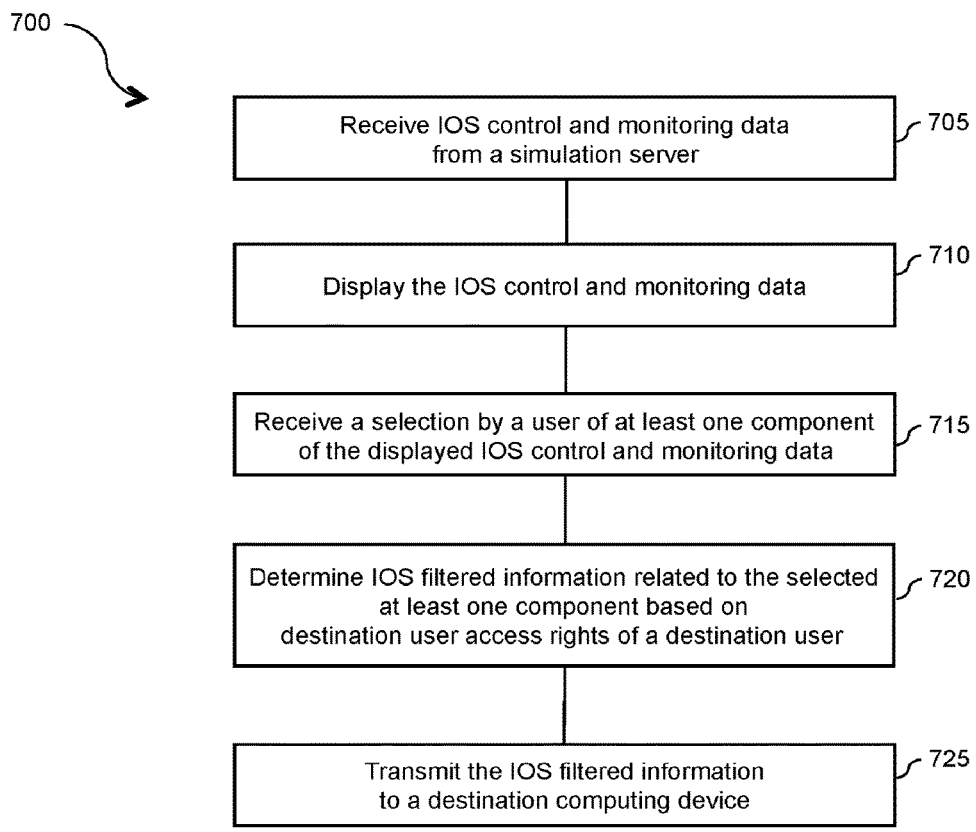
FIG. 9 represents a method for transmitting IOS filtered information.

Referring more specifically to FIGS. 7A, 8 and 9, the entities represented in FIG. 7A are the same as the entities represented in FIG. 2B (which have already been described in details), and the portable computing device 400 represented in FIG. 8 corresponds to the portable computing device 400 represented in FIG. 3C (which has already been described in details) with additional functionalities for generating the IOS filtered information to be transmitted. FIG. 9 represents a method 700 for transmitting IOS filtered information, which can be implemented by the portable computing device 400 represented in FIG. 8.

At step 705 of the method 700, the processing unit 401 of the portable computing device 400 receives IOS control and monitoring data 222 from the simulation server 200 via the communication interface 403 of the portable computing device 400. The IOS control and monitoring data 222 are generated and transmitted by the server IOS functionality 220 of the simulation server 200.

Figure 10A:
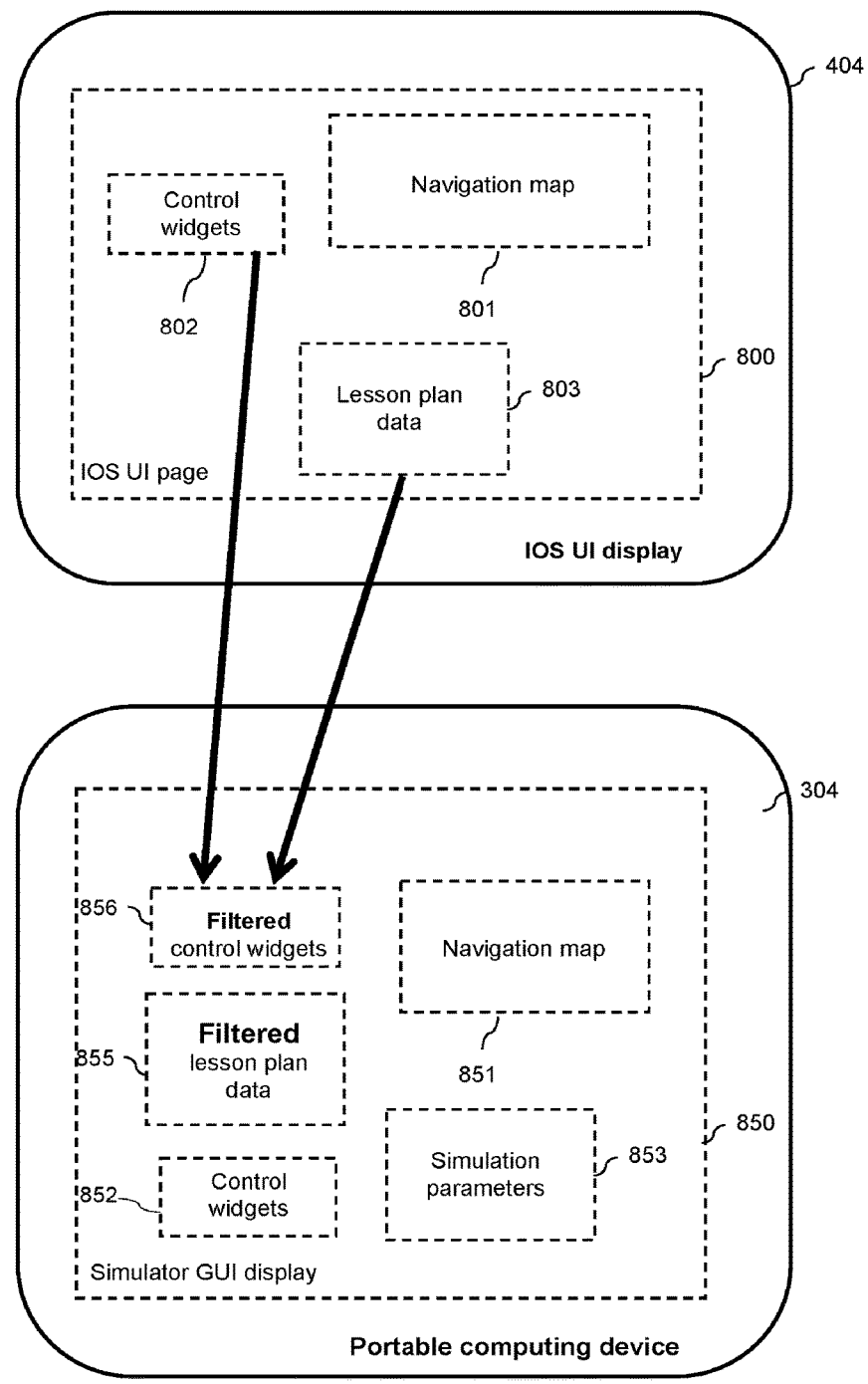
FIGS. 10A and 10B illustrate the transfer of IOS filtered information consisting of filtered IOS User Interface (UI) pages.

At step 710 of the method 700, the processing unit 401 displays the IOS control and monitoring data 222 on the display 404 of the portable computing device 400. The display is performed by the display function 421 of the portable computing device IOS UI 420 executed by the processing unit 401. FIG. 10A illustrates an example where the IOS control and monitoring data 222 consist in an IOS UI page 800 displayed on the display 404.

As described previously in details, the processing unit 401 generates IOS interaction data 222, which are transmitted to the simulation server 200 via the via the communication interface 403. The transmitted IOS interaction data 222 are further processed by the server IOS functionality 220 of the simulation server 200, to control the execution of a simulation by the simulation server 200. The transmitted IOS interaction data 222 correspond to interactions of the user 10 with the IOS control and monitoring data displayed on the display 404 via the user interface 405 of the portable computing device 400. The generation and transmission of the IOS interaction data 222 is performed by the interaction function 422 of the portable computing device IOS UI 420 executed by the processing unit 401.

The interactions of the user 10 with the user interface 405 are not limited to the generation of the IOS interaction data 222. According to step 715 of the method 700, the processing unit 401 may also receive a selection by the user 10 of at least one component of the IOS control and monitoring data displayed on the display 404, for the purpose of generating IOS filtered information. The selection corresponds to an interaction of the user 10 with the user interface 405, and the reception of the selection can be performed by the interaction function 422 of the portable computing device IOS UI 420.

At step 720 of the method 700, the processing unit 401 determines IOS filtered information related to the selected at least one component. The determination takes into consideration destination user access rights of a destination user 20. The destination user 20 is a user currently performing a simulation session on a destination computing device, such as the portable computing device 400' represented in FIG. 7A. The destination user access rights are used to determine which IOS information related to the selected at least one component can be shared with the destination user 20.

The determination can be performed in two steps. In a first step, IOS information logically related to the selected at least one component are determined. In this first step, the determination is based on the intrinsic structure/hierarchy of the displayed IOS control and monitoring data 222, to identify which IOS information is logically related to the selected at least one component. However, not all the IOS information determined in this first step may be shared with the destination user 20, based on its particular user access rights. Thus, in a second step, IOS filtered information are determined based on the IOS information identified at the first step, and further based on the destination user access rights. The IOS filtered information consists in a subset of the IOS information related to the selected at least one component determined at the first step, the subset being determined based on the destination user access rights.

The determination of the IOS filtered information can be performed by a dedicated functionality (the filtering function 423 represented in FIG. 8) of the portable computing device IOS UI 420 executed by the processing unit 401. The destination user access rights are stored in the memory 402 of the portable computing device 400, as will be detailed later in the description.

At step 725 of the method 700, the processing unit 401 transmits the IOS filtered information 224 to the destination computing device via the communication interface 403. In the particular embodiment illustrated in FIG. 7A, the destination computing device is the portable computing device 400', which is capable of displaying the IOS filtered information 224 on a display of the destination portable computing device 400'. As mentioned previously in the description, the portable computing device GUI 430 executed by the portable computing device 400' displays GUI graphical data 232 (and optionally simulation data 212), received from the simulation server 200, on the display of the portable computing device 400'. The IOS filtered information 224 can also be displayed by the portable computing device GUI 430, and may be integrated with the displayed GUI graphical data 232 (and optionally simulation data 212). The display of the IOS filtered information 224 will be detailed later in the description, in relation to FIGS. 10A and 10B.

In a particular aspect, the user 10 is an instructor controlling and monitoring the execution of a simulation executed by the simulation server 200, and further controlling and monitoring the interactions of a trainee 20 with the simulation. The IOS filtered information 224 shared by the instructor 10 with the trainee 20 are usually not available to the trainee 20. However, in particular circumstances, the instructor 10 may share the IOS filtered information 224 with the trainee 20. For instance, if the trainee 20 fails to accurately perform a specific simulation procedure (e.g. landing phase of an aircraft), the IOS filtered information 224 may provide additional feedback, contextual data, etc. to the trainee 20, in order to help him better understand the reasons of his failure. The IOS filtered information 224 are filtered because a trainee shall not have access to all the information available to the instructor.

Figure 7B:
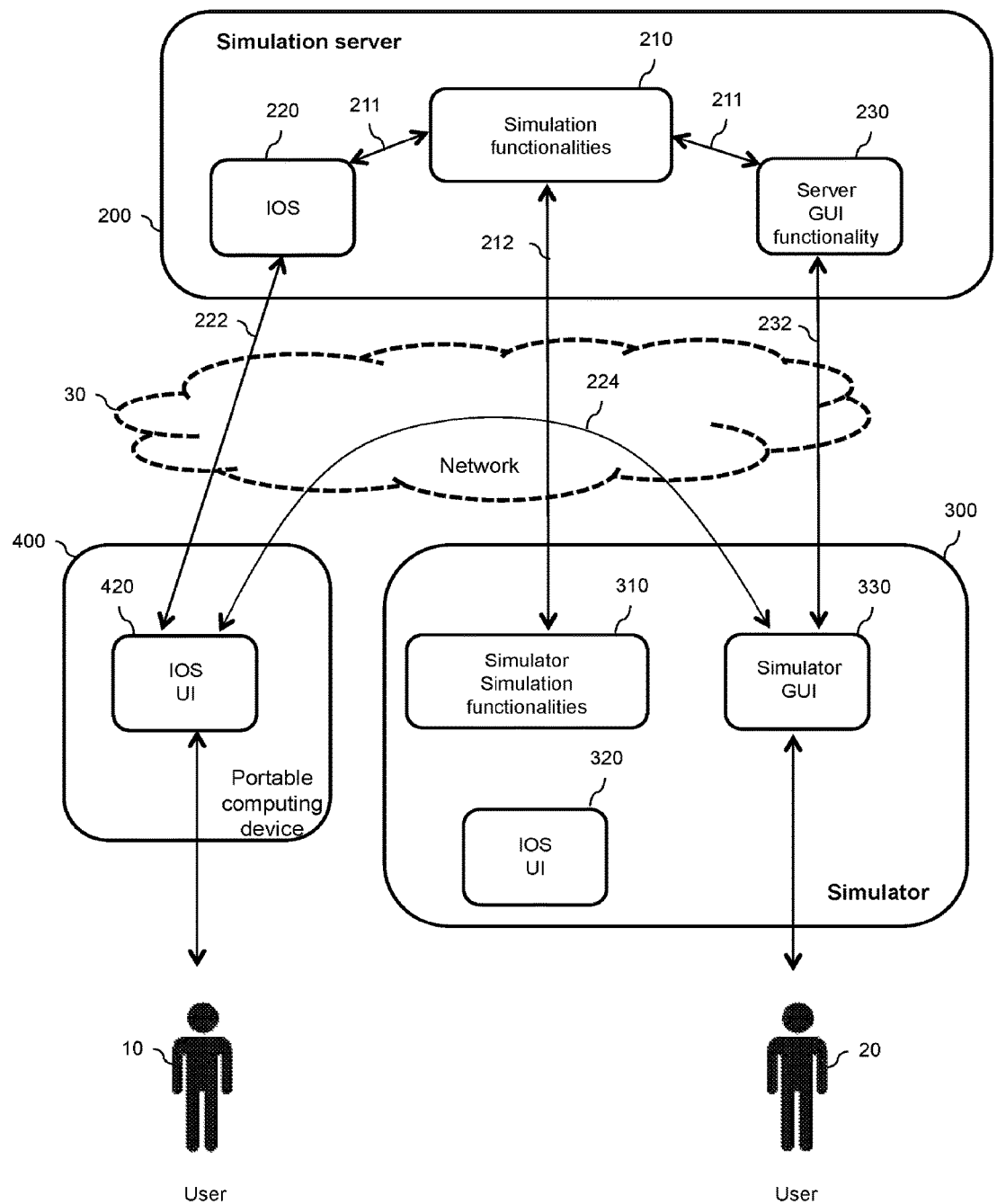

Referring more specifically to FIGS. 7B and 8, in the particular embodiment illustrated in FIG. 7B, the destination computing device is the simulator 300, which is capable of displaying the IOS filtered information 224 on a display of the simulator 300. As mentioned previously in the description, the simulator GUI 330 executed by the simulator 300 displays GUI graphical data 232 received from the simulation server 200 on the display of the simulator 300. The IOS filtered information 224 can also be displayed by the simulator GUI 330, and can be integrated with the displayed GUI graphical data 232.

Figure 7C:
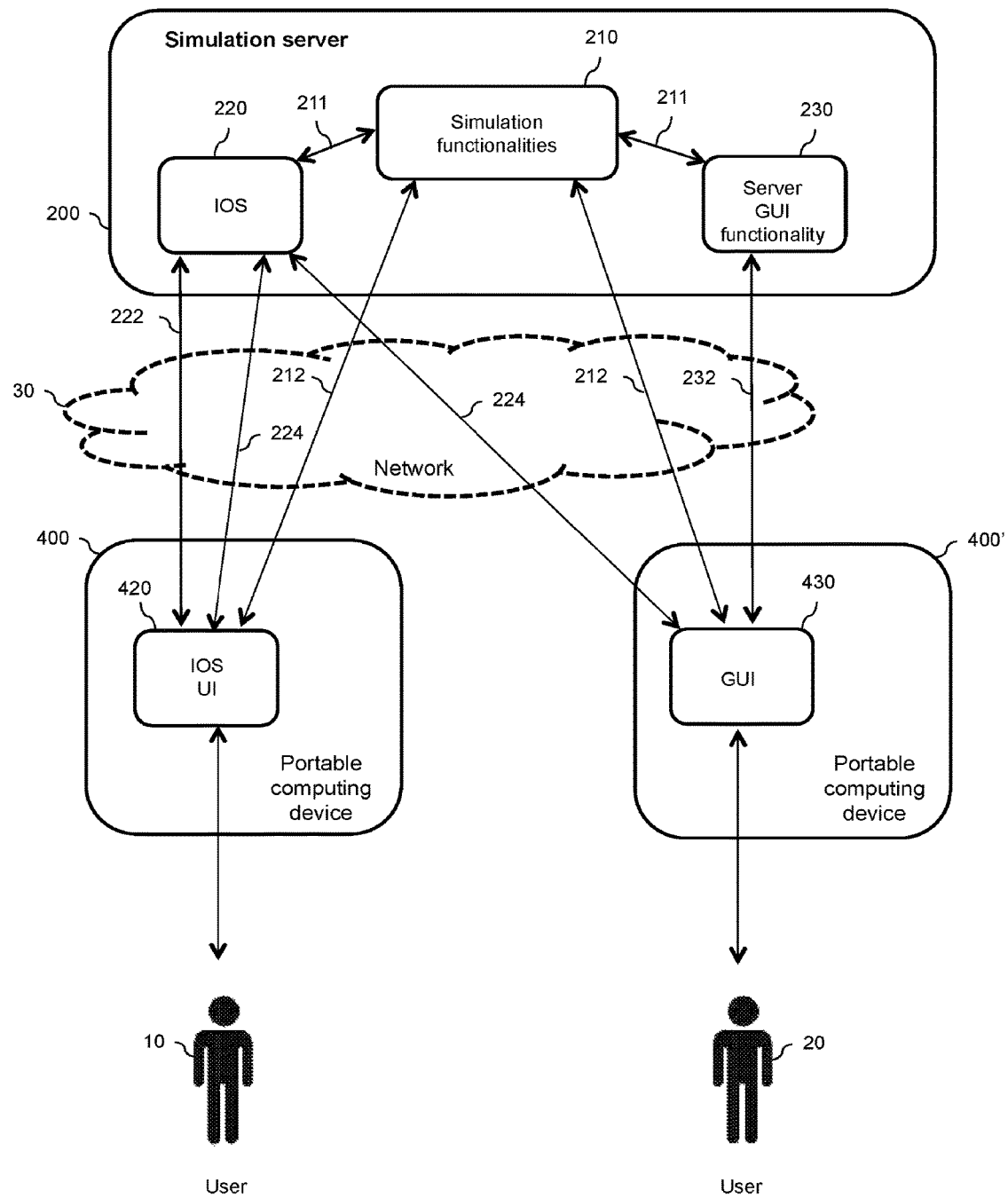

Referring more specifically to FIGS. 7C and 8, in the particular embodiment illustrated in FIG. 7C, the destination computing device is the simulator server 200. The simulation server 200 receives the IOS filtered information 224, and forwards them to the portable computing device 400'. The display of the IOS filtered information 224 on the display of the portable computing device 400' has already been described in relation to FIG. 7A. Although in FIG. 7C, the reception and forwarding of the IOS filtered information 224 is performed by the server IOS functionality 220, the reception and/or forwarding may be performed by another functionality of the simulation server 200 (e.g. reception by the server IOS functionality 220 and forwarding by the server GUI functionality 230).

Figure 7D:
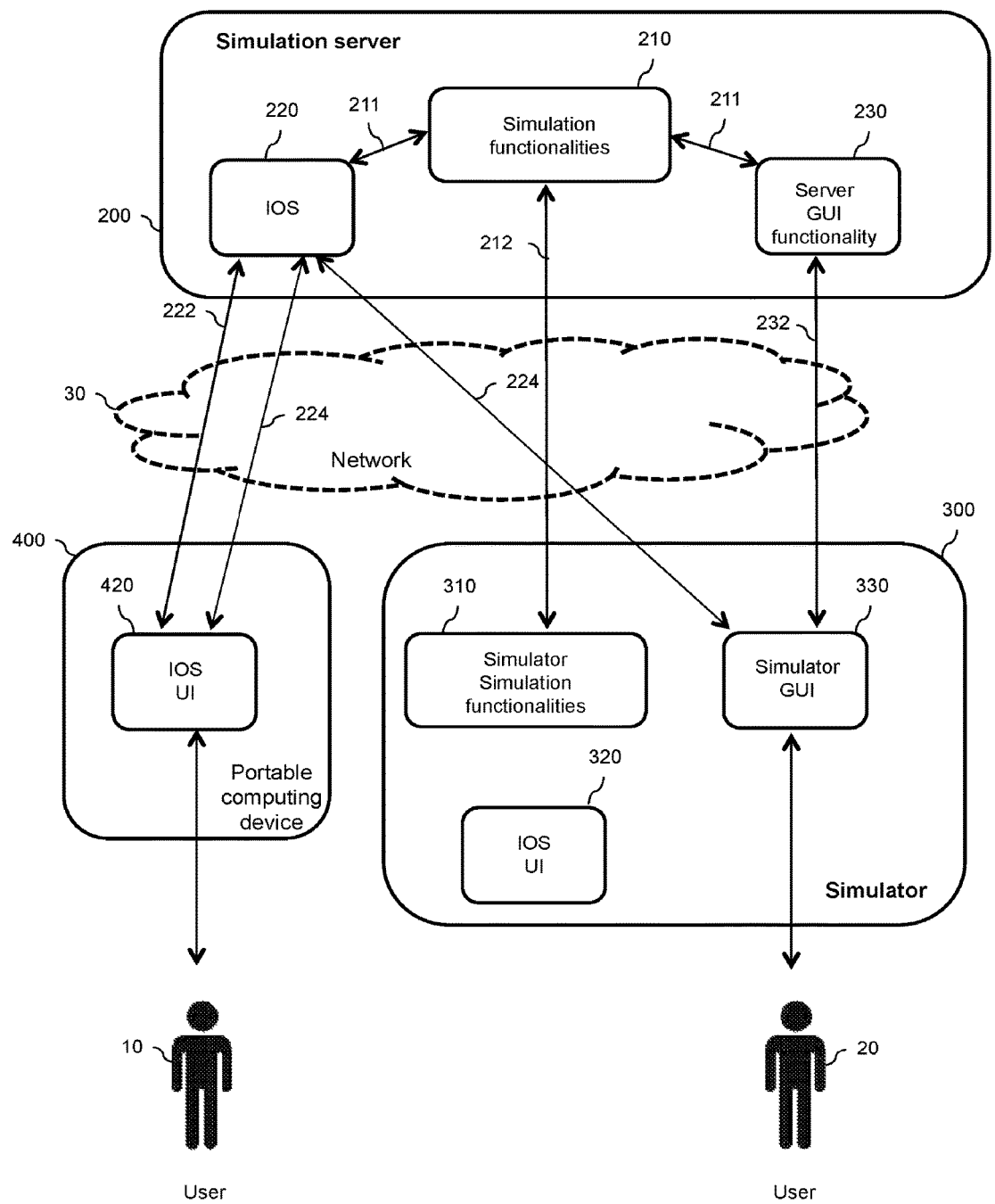

Referring more specifically to FIGS. 7D and 8, in the particular embodiment illustrated in FIG. 7D, the destination computing device is the simulator server 200. The simulation server 200 receives the IOS filtered information 224, and forwards them to the simulator 300. The display of the IOS filtered information 224 on the display of the simulator 300 has already been described in relation to FIG. 7B.

In a particular aspect, the memory 402 of the portable computing device 400 may store simulation session data, as illustrated in FIG. 8. The simulation session data include the destination user access rights used for determining the IOS filtered information 224 to be transmitted. The simulation session data also include an indication that the destination user 20 is currently performing a simulation session on the portable computing device 400' (as illustrated in FIGS. 7A and 7C) or on the simulator 300 (as illustrated in FIGS. 7B and 7D). As mentioned previously in the description, the execution of the simulation session on the portable computing device 400' or on the simulator 300 is controlled through interactions of the user 10 with the IOS control and monitoring data 222 displayed on the display 404 of the portable computing device 400, via the user interface 405 of the portable computing device 400. The simulation session data may be generated by the server IOS functionality 220 of the simulation server 200, and transmitted to the portable computing device 400' for storage in its memory 402. Updated simulation session data can be generated and transmitted by the server IOS functionality 220, based on which user(s) 20 are currently performing a simulation session on a portable computing device 400' or simulator 300, the simulation session being supported by the execution of a simulation on the simulation server 200. For this purpose, the server IOS functionality 220 of the simulation server 200 maintains a mapping between each specific user 10 controlling and monitoring (via the portable computing device IOS UI 420 of the portable computing device 400) a simulation session performed by a specific user 20 on a portable computing device 400' or on a simulator 300, and between the corresponding specific user 20. Additionally, the simulation server 200 stores the destination user access rights of all the destination users 20 (e.g. trainees) who are allowed to perform a simulation session via the simulation server 200, under the supervision of a user 10 (e.g. an instructor). The simulation session data may also include routing information allowing the transmission of the IOS filtered information 224 to the destination portable computing device 400' or simulator 300 of the destination user 20. For instance, the routing information include the IP address of the destination portable computing device 400' or simulator 300, a logical name of the destination portable computing device 400' or simulator 300 resolvable via a Domain Name Server (DNS), etc.

In a particular aspect, the IOS control and monitoring data 222 (received at step 705 and displayed at step 710 of the method 700) comprise one or more IOS User Interface (UI) pages, which will be referred to as original IOS UI pages. IOS UI pages have already been described previously.

The IOS filtered information (determined at step 720 of the method 700) comprises a subset of the one or more original IOS UI pages. As mentioned in step 720, the subset is determined based on the destination user access rights. The IOS filtered information can be referred to as filtered IOS UI page(s) consisting in the subset of the one or more original IOS UI pages.

Following is an example of how the filtered IOS UI page(s) may be determined. The selection (at step 715 of the method 700) of at least one component of the displayed IOS control and monitoring data consists in the selection of at least one component of the displayed one or more original IOS UI pages. A first subset of the one or more original IOS UI pages corresponding to the selected at least one component is determined. The correspondence between the selected at least one component and the first subset of the one or more original IOS UI pages is generally static, and is defined by the architecture of the one or more original IOS UI pages. For example, upon selection of a particular component of a specific IOS UI page among the one or more original IOS UI pages, the first subset of the one or more original IOS UI pages may consist in the specific IOS UI page only, or in the specific IOS UI page and other original IOS UI page(s) hierarchically related to the specific IOS UI page. The first subset of the one or more original IOS UI pages is further filtered based on the destination user access rights, to obtain the filtered IOS UI page(s). The filtering consists in excluding from the first subset particular IOS UI page(s) that the destination user is not allowed to visualize, as specified by its destination user access rights.

For each filtered IOS UI page (which corresponds to one of the original IOS UI pages), the components of the filtered IOS UI page comprise a subset of the components of the corresponding original IOS UI page. The subset of components is also determined based on the destination user access rights. The subset of components can be referred to as the filtered components of the filtered IOS UI page.

Following is an example of how the filtered components of the filtered IOS UI page may be determined. A first subset of components is determined from the original IOS UI page corresponding to the filtered IOS UI page. The first subset of components consists in components of the original IOS UI page which correspond to the selected at least one component of step 715. As mentioned previously, the correspondence between the selected at least one component of step 715 and the first subset of component of the original IOS UI page is generally static, and is defined by the architecture of the original IOS UI page. All the components of the original IOS UI page may be part of the first subset. Alternatively, only some of the components of the original IOS UI page hierarchically related to the selected at least one component of step 715 are part of the first subset. The first subset of components is further filtered based on the destination user access rights, to obtain the final subset of filtered components. The filtering consists in excluding from the first subset particular components that the destination user is not allowed to visualize, as specified by its destination user access rights. The filtered components may include sub-components, which are also filtered based on the destination user access rights, in a similar manner as the components.

Reference is now made concurrently to FIGS. 7B, 8, 9, 10A and 10B. FIG. 10A represents an IOS UI page 800 displayed on the display 404 of the portable computing device 400. The IOS UI page 800 is displayed by the display function 421 of the portable computing device IOS UI 420. The IOS UI page 800 generally includes graphical control elements (e.g. menus and sub-menus, list boxes, behavioral data, flight profile, events, metrics, training results, training assessment, etc.) for controlling simulation parameters, and graphical display elements (e.g. images, text and/or numerical fields, icons, embedded videos, etc.) for displaying simulation data generated and transmitted by the simulation server 200.

The IOS UI page 800 represented in FIG. 10A comprises an image 801 (Navigation map), graphical control elements 802 (control widgets), and lesson plan data 803. The generation of components 801, 802 and 803 of the IOS UI page 800 by the simulation server 200, the transmission of the components 801, 802 and 803 from the simulation server 200 to the portable computing device 400, and the display of the components 801, 802 and 803 by the portable computing device 400, have already been described in relation to the IOS UI page 500 represented in FIG. 5.

For illustration purposes, FIG. 10A corresponds to the embodiments represented in FIGS. 7B and 7D, where IOS filtered information 224 are transmitted (directly in FIG. 7B, and via the simulation server 200 in FIG. 7D) by the portable computing device IOS UI 420 to the simulator GUI 330. The user 10 of the portable computing device 400 interacts with the IOS UI page 800, while the user 20 of the simulator 300 interacts with a simulator GUI display 850 represented in FIG. 10A. However, the subject matter recited in the following paragraphs can also be applied to the embodiments represented in FIGS. 7A and 7C, where the user 10 of the portable computing device 400 interacts with the IOS UI page 800, while the user 20 of the portable computing device 400' interacts with a portable computing device GUI display (displayed on the display of the portable computing device 400') not represented in the Figures.

The simulator GUI display 850 represented in FIG. 10A is displayed on the display 304 of the simulator 300. The simulator GUI display 850 is displayed by the simulator GUI functionality 330 represented in FIG. 3B. The simulator GUI display 850 comprises an image 851 (Navigation map corresponding to the Navigation map 801 of the IOS UI page 800), graphical control elements 852 (control widgets), and simulation parameters 853 (e.g. altitude of an aircraft, speed of an aircraft, etc.).

The user 10 of the portable computing device 400 interacts with the control widgets 802 to select the lesson plan data 803, as per step 715 of the method 700. The interaction also includes an indication that the lesson plan data 803 shall be transferred to the destination user 20 currently performing a simulation session on the simulator 20. A filtered IOS UI page corresponding to the IOS UI page 800 is generated based on the user access rights of the destination user 20, as per step 720 of the method 700. The filtered IOS UI page comprises the filtered lesson plan data 855 and the filtered control widgets 856 represented in 10B. The filtered lesson plan data 855 comprise a subset of the information of the lesson plan data 803, the subset consisting in information which can be shared with the destination user 20 according to its user access rights. The filtered control widgets 856 comprise a subset of the control widgets 802, the subset allowing the user 20 to navigate through the filtered lesson plan data 855 in a similar manner as user 10 navigates through the lesson plan data 803 with the control widgets 802.

For example, the lesson plan data 803 include a plurality of simulation events, and a plurality of simulation parameters which can be modified by the user 10 for controlling the execution of the simulation events by the simulation server 200. Each simulation event includes an objective, a tolerance margin for the objective, and a result effectively achieved by the user 20. The plurality of simulation events may be defined as a plurality of IOS UI pages 800. For each particular simulation event, a particular IOS UI page 800 comprising particular lesson plan data 803 is displayed. The particular lesson plan data 803 include the plurality of simulation parameters which can be modified by the user 10 (via the control widgets 802) for controlling the execution of the particular simulation event by the simulation server 200. The particular lesson plan data 803 also include the objective/tolerance margin/result effectively achieved by the user 20, with respect to the particular simulation event.

Figure 10B:
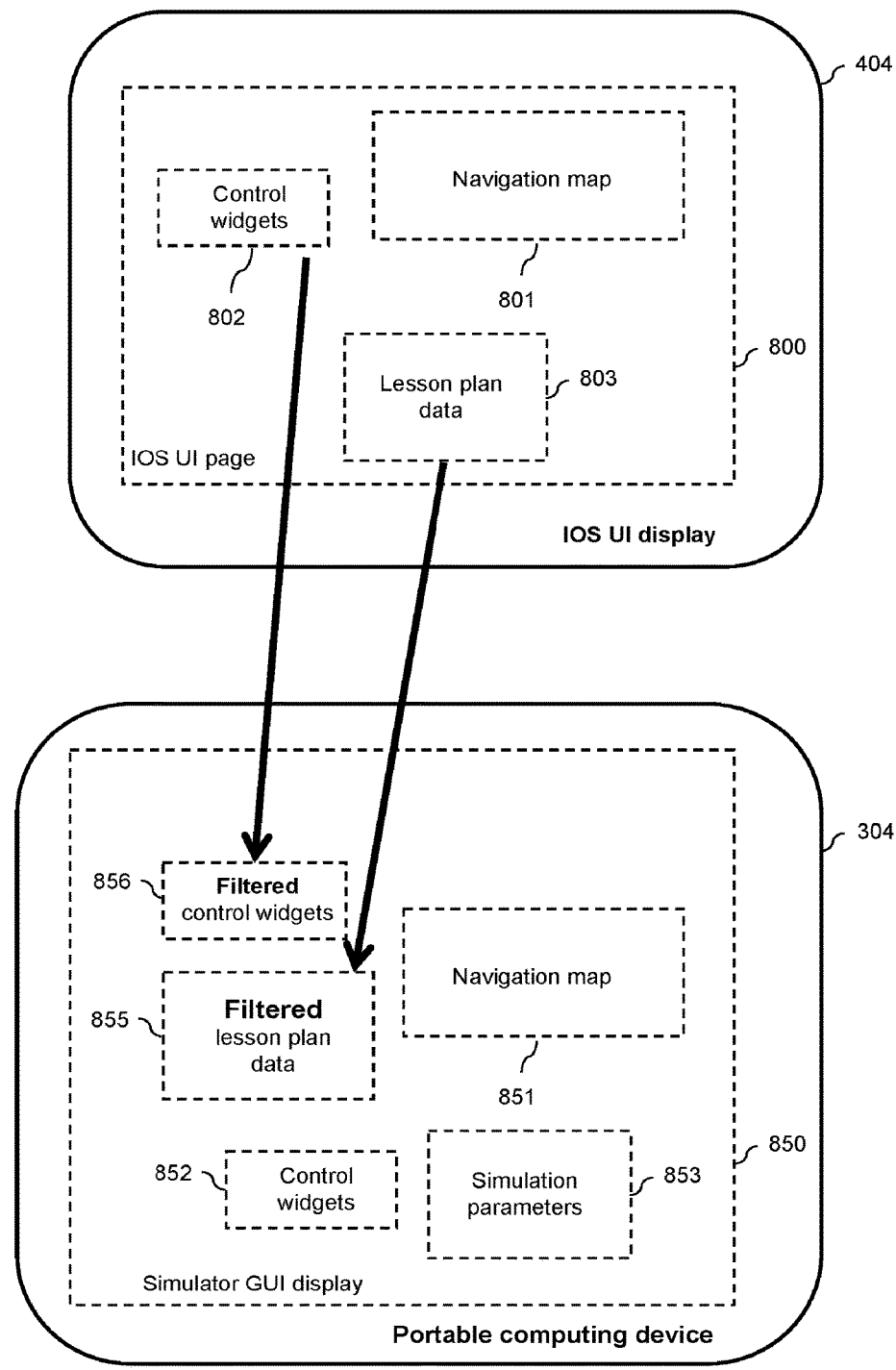

If the results effectively achieved by the user 20 are not satisfying, the user 10 may decide to share some information with the user 20, to help him better understand why he failed. For this purpose, and as mentioned previously, the filtered lesson plan data 855 and the filtered control widgets 856 are transmitted (as per step 725 of the method 700) from the portable computing device 400 to the simulator 300, and further displayed on the display 304 of the simulator 300 as illustrated in FIG. 10B. The user access rights of the user 20 define, for each particular simulation event, which information can be shared. For instance, only the objective, the result, and a subset of the simulation parameters, can be shared. The lesson plan data 803 containing all the simulation parameters, the objective, the tolerance margin, and the result are filtered to generate the filtered lesson plan data 855 containing only the subset of the simulation parameters which can be shared, the objective, and the result.

In a particular aspect, the IOS control and monitoring data displayed at step 710 of the method 700 comprise a hierarchy of IOS UI pages, and the IOS filtered information determined at step 720 of the method 700 comprises a subset of the hierarchy of IOS UI pages, the subset being determined based on the destination user access rights. For example, upon selection of the lesson plan data 803 as per step 715 of the method 700, a hierarchy of IOS UI pages (not represented in FIGS. 10A and 10B) logically related to the IOS UI page 800 (and more specifically logically related to the lesson plan data 803 of the IOS UI page 800) is identified. The hierarchy of identified IOS UI pages is further filtered based on the destination user access rights, to generate the subset of the hierarchy of identified IOS UI pages which is transmitted to the destination user 20.

In another aspect (referring to FIGS. 8 and 9), a non-transitory computer program product comprises instructions, which when executed by the processing unit 401 of the portable computing device 400 implement the method 700. More specifically, the execution of the instructions implements at least steps 705, 710, 715, 720 and 725 of the method 700 represented in FIG. 9. The non-transitory computer program product may consist in the memory 402 of the portable computing device 400. The instructions are deliverable to the non-transitory computer program product via an electronically-readable media, such as storage media (e.g. a CD-ROM, a USB key, etc.) and communication links (e.g. the network 30 via the communication interface 403 of the portable computing device 400).

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A portable computing device comprising:
   a display;
   a user interface for allowing interactions of a user with the portable computing device;
   a communication interface for exchanging data with other entities;
   a processing unit for:
   receiving Instructor Operating Station (IOS) control and monitoring data from a simulation server via the communication interface, the IOS control and monitoring data allowing the user of the portable computing device to control execution of a simulation in real-time;
   receiving simulation session data via the communication interface, the simulation session data comprising destination user access rights and an indication of a destination user that is currently executing the simulation;
   displaying the IOS control and monitoring data on the display;
   receiving a selection by the user of at least one component of the IOS control and monitoring data displayed on the display via the user interface;
   determining IOS filtered information as a subset of information related to the selected at least one component, the determination of the IOS filtered information taking into consideration the destination user access rights of the destination user currently executing the simulation; and
   transmitting the IOS filtered information to a destination computing device separate from the portable computing device via the communication interface.

2. The portable computing device of claim 1, wherein the destination computing device is a destination portable computing device capable of displaying the IOS filtered information on a display of the destination portable computing device.

3. The portable computing device of claim 2, wherein the destination user is currently executing the simulation on the destination portable computing device, the execution of the simulation on the destination portable computing device being controlled in real-time through interactions of the user with the IOS control and monitoring data displayed on the display via the user interface.

4. The portable computing device of claim 1, wherein the destination computing device is a simulator capable of displaying the IOS filtered information on a display of the simulator.

5. The portable computing device of claim 4, wherein the destination user is currently executing the simulation on the simulator, the execution of the simulation on the simulator being controlled in real-time through interactions of the user with the IOS control and monitoring data displayed on the display via the user interface.

6. The portable computing device of claim 1, wherein the destination computing device is the simulation server, and the simulation server forwards the IOS filtered information to a destination portable computing device, the destination portable computing device being capable of displaying the IOS filtered information on a display of the destination portable computing device.

7. The portable computing device of claim 6, wherein the destination user is currently executing the simulation on the destination portable computing device, the execution of the simulation on the destination portable computing device being controlled in real-time through interactions of the user with the IOS control and monitoring data displayed on the display via the user interface.

8. The portable computing device of claim 1, wherein the destination computing device is the simulation server, and the simulation server forwards the IOS filtered information to a simulator, the simulator being capable of displaying the IOS filtered information on a display of the simulator.

9. The portable computing device of claim 8, wherein the destination user is currently executing the simulation on the simulator, the execution of the simulation on the simulator being controlled in real-time through interactions of the user with the IOS control and monitoring data displayed on the display via the user interface.

10. The portable computing device of claim 1, wherein the IOS filtered information consists in a subset of IOS information related to the selected at least one component, the subset being determined based on the destination user access rights.

11. The portable computing device of claim 1, wherein the IOS control and monitoring data comprise one or more IOS User Interface (UI) pages.

12. The portable computing device of claim 11, wherein the IOS filtered information comprises a subset of the one or more IOS UI pages, the subset being determined based on the destination user access rights.

13. The portable computing device of claim 11, wherein the IOS filtered information comprises at least one filtered IOS UI page corresponding to an original IOS UI page, the components of the filtered IOS UI page comprising a subset of the components of the corresponding original IOS UI page, the subset being determined based on the destination user access rights.

14. The portable computing device of claim 1, wherein the IOS control and monitoring data comprise a hierarchy of IOS UI pages, and the IOS filtered information comprises a subset of the hierarchy of IOS UI pages, the subset being determined based on the destination user access rights.

15. The portable computing device of claim 1, wherein the processing unit generates IOS interaction data corresponding to interactions of the user with the IOS control and monitoring data displayed on the display via the user interface, and the processing unit transmits the IOS interaction data to the simulation server via the communication interface.

16. The portable computing device of claim 1, further comprising memory for storing the simulation session data.

17. A method for transmitting Instructor Operating Station (IOS) filtered information, the method comprising:
- receiving by a processing unit of a portable computing device IOS control and monitoring data from a simulation server via a communication interface of the portable computing device, the IOS control and monitoring data allowing a user of the portable to control execution of a simulation in real-time;
- receiving by the processing unit simulation session data via the communication interface of the portable computing device, the simulation session data comprising destination user access rights and an indication of a destination user that is currently executing the simulation;
- displaying by the processing unit the IOS control and monitoring data on a display of the portable computing device;
- receiving by the processing unit a selection by the user of at least one component of the IOS control and monitoring data displayed on the display, the selection being performed by an interaction of the user with the displayed IOS control and monitoring data via a user interface of the portable computing device;
- determining by the processing unit IOS filtered information as a subset of information related to the selected at least one component, the determination of the IOS filtered information taking into consideration the destination user access rights of the destination user currently executing the simulation; and
- transmitting by the processing unit the IOS filtered information to a destination computing device separate from the portable computing device via the communication interface.

18. A non-transitory computer program product comprising instructions deliverable via an electronically-readable media, such as storage media and communication links, the instructions when executed by a processing unit of a portable computing device providing for transmitting Instructor Operating Station (IOS) filtered information by:
- receiving by the processing unit IOS control and monitoring data from a simulation server via a communication interface of the portable computing device, the IOS control and monitoring data allowing a user of the portable to control execution of a simulation in real-time;
- receiving by the processing unit simulation session data via the communication interface of the portable computing device, the simulation session data comprising destination user access rights and an indication of a destination user that is currently executing the simulation;
- displaying by the processing unit the IOS control and monitoring data on a display of the portable computing device;
- receiving by the processing unit a selection by the user of at least one component of the IOS control and monitoring data displayed on the display, the selection being performed by an interaction of the user with the displayed IOS control and monitoring data via a user interface of the portable computing device;
- determining by the processing unit IOS filtered information as a subset of information related to the selected at least one component, the determination of the IOS filtered information taking into consideration the destination user access rights of the destination user currently executing the simulation; and
- transmitting by the processing unit the IOS filtered information to a destination computing device separate from the portable computing device via the communication interface.

* * * * *